(12) United States Patent
Yamashita et al.

(10) Patent No.: US 12,110,382 B2
(45) Date of Patent: Oct. 8, 2024

(54) POLYOLEFIN MICROPOROUS MEMBRANE

(71) Applicant: Asahi Kasei Kabushiki Kaisha, Tokyo (JP)

(72) Inventors: Akihisa Yamashita, Tokyo (JP); Manabu Sekiguchi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 1064 days.

(21) Appl. No.: 16/753,121

(22) PCT Filed: Aug. 9, 2019

(86) PCT No.: PCT/JP2019/031755
§ 371 (c)(1),
(2) Date: Sep. 10, 2020

(87) PCT Pub. No.: WO2020/179101
PCT Pub. Date: Sep. 10, 2020

(65) Prior Publication Data
US 2021/0214535 A1 Jul. 15, 2021

(30) Foreign Application Priority Data
Mar. 4, 2019 (JP) ................. 2019-038419

(51) Int. Cl.
C08L 23/06 (2006.01)
C08J 9/26 (2006.01)
H01M 50/409 (2021.01)
H01M 50/417 (2021.01)
H01M 50/491 (2021.01)
H01M 50/494 (2021.01)

(52) U.S. Cl.
CPC ............. C08L 23/06 (2013.01); C08J 9/26 (2013.01); H01M 50/409 (2021.01); H01M 50/417 (2021.01); H01M 50/491 (2021.01); C08J 2323/06 (2013.01); C08J 2423/12 (2013.01); H01M 50/494 (2021.01)

(58) Field of Classification Search
CPC ......... C08J 5/18; C08J 9/26; C08J 9/28; C08J 2323/06; C08J 2323/12; C08J 2423/12; C08K 5/105; C08L 23/06; C08L 23/12; H01M 50/403; H01M 50/409; H01M 50/417; H01M 50/489; H01M 50/491; H01M 50/494; Y02E 60/10; Y02P 70/50
See application file for complete search history.

(56) References Cited

U.S. PATENT DOCUMENTS

| | | |
|---|---|---|
| 5,683,634 A | 11/1997 | Fujii et al. |
| 2009/0170005 A1 | 7/2009 | Kimishima et al. |
| 2009/0186280 A1 | 7/2009 | Iidani et al. |
| 2010/0069596 A1* | 3/2010 | Kimishima ....... H01M 10/4235 526/348 |
| 2011/0059368 A1 | 3/2011 | Inagaki et al. |
| 2011/0268942 A1 | 11/2011 | Rhee |
| 2011/0318669 A1 | 12/2011 | Miyake et al. |
| 2017/0125763 A1* | 5/2017 | Inatomi ............... H01M 50/494 |
| 2020/0024419 A1 | 1/2020 | Yamashita et al. |
| 2020/0067138 A1 | 2/2020 | Hashiwaki et al. |

FOREIGN PATENT DOCUMENTS

| | | |
|---|---|---|
| JP | H07-029563 A | 1/1995 |
| JP | H11-323150 A | 11/1999 |
| JP | 3995471 B | 10/2007 |
| JP | 2009-149710 A | 7/2009 |
| JP | 2011-225736 A | 11/2011 |
| JP | 5250261 B2 | 4/2013 |
| JP | 5334273 A | 11/2013 |
| JP | 2014-162851 A | 9/2014 |
| JP | 2017-128639 A | 7/2017 |
| JP | 2017-142985 A | 8/2017 |
| JP | 2017-203145 A | 11/2017 |
| JP | 2018-141029 A | 9/2018 |
| KR | 10-2014-0048164 A | 4/2014 |
| WO | 2007/069560 A1 | 6/2007 |
| WO | 2008/069216 A1 | 6/2008 |
| WO | 2009/136648 A1 | 11/2009 |
| WO | 2018/078710 A1 | 5/2018 |
| WO | 2018/179810 A1 | 10/2018 |

OTHER PUBLICATIONS

International Preliminary Report on Patentability and Written Opinion issued in corresponding International Patent Application No. PCT/JP2019/031755 dated Sep. 16, 2021.
International Search Report issued in corresponding International Patent Application No. PCT/JP2019/031755 dated Oct. 15, 2019.
Supplementary European Search Report issued in corresponding European Patent Application No. 19868147.0 dated Jul. 22, 2021.

* cited by examiner

*Primary Examiner* — John M Cooney
(74) *Attorney, Agent, or Firm* — Morgan, Lewis & Bockius LLP

(57) ABSTRACT

Provided is a polyolefin microporous membrane having a loss tangent (tan δ) at 230° C. of 0.35 or more and less than 0.60 in melt viscoelasticity measurement.

13 Claims, 1 Drawing Sheet

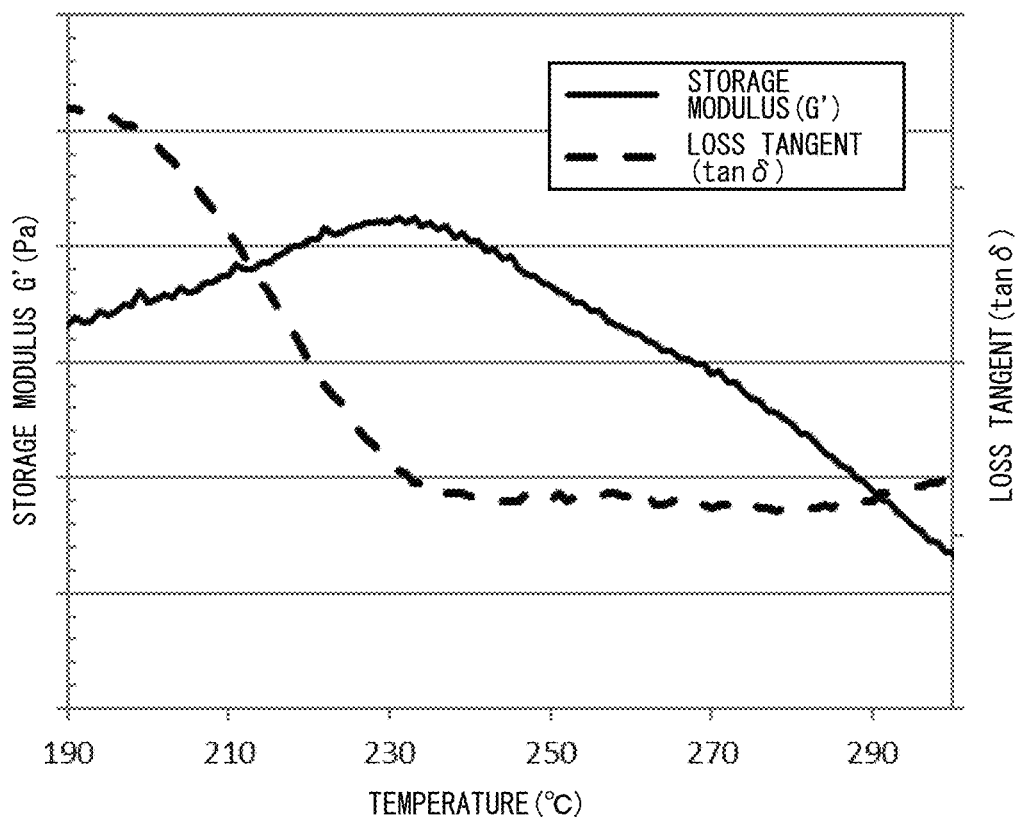

POLYOLEFIN MICROPOROUS MEMBRANE

FIELD

The present invention relates to a polyolefin microporous membrane.

BACKGROUND

Polyolefin microporous membranes have been used as separators for batteries, separators for capacitors, materials for fuel cells, microfiltration membranes, etc., and in particular, as separators for lithium ion secondary batteries (LIBs) or constituent materials thereof. Separators prevent direct contact between positive electrodes and negative electrodes and also permeate ions through electrolytic solutions held in their micropores.

In recent years, LIBs have been used for applications of miniature electronic devices such as cellular phones and laptop computers, etc., and also applied to electric vehicles including electric cars and small electric motorcycles, etc. Since in-vehicle LIBs tend to have a larger capacity per unit cell with the aim of extending a cruising distance, a battery having a large capacity per volume has been developed. For this reason, the amount of heat generated upon abnormal heat generation of batteries due to internal short-circuit when foreign substances are present in the batteries, also tends to increase, and in some cases, the local temperature of the short-circuited portion inside the batteries may rise to nearly 300° C. in a few seconds. Therefore, for in-vehicle LIBs, improvement of safety has been a more important issue.

A property required for a separator for LIBs in order to improve safety thereof includes a function of terminating a thermal runaway by increasing resistance upon internal short-circuit or a property of hardly shrinking by heat.

Here, various raw materials or materials for a polyolefin microporous membrane have been investigated as a separator for LIBs (PTLs 1 to 5).

PTL 1 describes a heat resistant synthetic resin microporous film containing an olefin resin, wherein the heat resistant synthetic resin microporous film has a gel fraction of 30% or more, a storage modulus Er at 250° C. of 0.01 MPa or more by dynamic viscoelasticity, and a maximum shrinkage in TMA of 25% or less. Such a heat resistant synthetic resin microporous film is formed on at least one portion of the surface of the synthetic resin microporous film and comprises a coating layer containing a polymer of a polymerizable compound having two or more polymerizable functional groups in one molecule. PTL 1 describes that such a heat resistant synthetic resin microporous film has low thermal shrinkage and low flowability and is excellent in meltdown resistance.

PTL 2 describes a heat resistant synthetic resin microporous film containing a synthetic resin microporous film containing a polyolefin-based resin, wherein the heat resistant synthetic resin microporous film has a gel fraction of 75% by weight or more, a storage modulus Er at 40 to 250° C. of 0.008 MPa or more by dynamic viscoelasticity, a maximum shrinkage in TMA of 25% or less, and a radical amount of $2.0 \times 10^{16}$ spins/100 mg or less, which is measured by an electron spin resonance method. PTL 2 describes that such a heat resistant synthetic resin microporous film has low thermal shrinkage and low flowability.

PTL 3 describes a polyolefin microporous membrane containing a polyethylene-based resin as a main component that has an angular frequency equal to or less than 10 rad/sec, at which a storage modulus and a loss modulus obtained by melt viscoelasticity measurement at a constant temperature in a range of 160° C. to 220° C., are coincided with each other. PTL 3 describes that such a polyolefin microporous membrane is excellent in shutdown characteristics and meltdown characteristics.

PTL 4 describes a polyolefin microporous membrane consisting of specific polyethylene and polypropylene, wherein the polyolefin microporous membrane satisfies specific relationship between a molecular weight determined by GPC/FTIR and a terminal methyl group concentration. PTL 4 describes that such a polyolefin microporous membrane is excellent in permeation performance and puncture strength and has a low pore-clog up temperature and an elevated temperature of membrane rupture by heat and is very excellent in elevated temperature-oven characteristics.

CITATION LIST

Patent Literature

[PTL 1] Japanese Unexamined Patent Publication No. 2017-128639
[PTL 2] Japanese Unexamined Patent Publication No. 2017-203145
[PTL 3] Japanese Patent Publication No. 5250261
[PTL 4] Japanese Patent Publication No. 3995471

SUMMARY

Technical Problem

The separators using the microporous film described in PTLs 1 and 2 have a number of chemical crosslinking points, and there remains a problem of an inferior shutdown property or low capability of increasing internal resistance of the battery at initial short-circuit. Moreover, since a chemical crosslinking reaction by the functional groups is required, there also remain problems of poor production efficiency and being susceptible of deterioration with an elapse of time.

Further, with an increase in battery capacity in recent years, it has been expected to secure safety in a more elevated temperature region than that assumed in PTLs 3 and 4 in order to obtain safety of batteries with a higher energy density.

Therefore, a separator exhibiting favorable short-circuit resistance in a short-circuit test under harsh conditions is required assuming the actual situation of a separator upon short-circuiting inside a battery in a field where a separator is required for higher safety in in-vehicle use, etc. Furthermore, since an in-vehicle LIB is repeatedly charged and discharged with a high output, a separator with a small capacity reduction is required even if the charge and discharge are repeated for a long time. Incidentally, such a problem is not limited to the separator used for in-vehicle LIBs, and similarly exists in a separator used for batteries with a high energy density.

Then, one of objects of the present invention is to provide a polyolefin microporous membrane which enables to inhibit thermal runaway when an internal short-circuit occurs inside a battery with a higher energy density due to presence of foreign substances, etc., Namely, an object of the present invention is to provide a polyolefin microporous membrane having a favorable short-circuit resistance in a short-circuit test under severe conditions. Incidentally, in one embodiment of the present invention, a polyolefin microporous membrane capable of securing favorable cycle characteristics of LIB is provided.

Solution to Problem

The inventors have found that the problems can be solved by setting a loss tangent (tan δ) to the specific range in melt viscoelasticity measurement of the polyolefin microporous membrane, and thus have completed the present invention. Namely, the present invention is as follow.

[1]
A polyolefin microporous membrane having a loss tangent (tan δ) at 230° C. of 0.35 or more and less than 0.60 in melt viscoelasticity measurement.

[2]
The polyolefin microporous membrane according to [1], having maximum loads in MD and TD both of 3.0 gf or less in TMA measurement.

[3]
The polyolefin microporous membrane according to [1] or [2], having a storage modulus (G') at 230° C. of $5.0 \times 10^4$ Pa or more in melt viscoelasticity measurement.

[4]
The polyolefin microporous membrane according to any one of [1] to [3], having a difference between a loss tangent at 190° C. (tan δ190) and a loss tangent at 230° C. (tan $\delta_{230}$) (tan $\delta_{230}$–tan δ190) of –0.05 or less (the difference ≤–0.05) in melt viscoelasticity measurement.

[5]
The polyolefin microporous membrane according to any one of [1] to [4], having a difference between a storage modulus at 190° C. (G'$_{190}$) and a storage modulus at 230° C. (G'$_{230}$) (G'$_{230}$–G'$_{190}$) of –1.0×10³ Pa or more (the difference ≥–1.0×10³ Pa) in melt viscoelasticity measurement.

[6]
The polyolefin microporous membrane according to any one of [1] to [5], having a difference between a storage modulus at 230° C. (G'$_{230}$) and a storage modulus at 280° C. (G'$_{280}$) (G'$_{280}$–G'$_{230}$) of –2.1×10⁴ Pa or more (the difference ≥–2.1×10⁴ Pa) in melt viscoelasticity measurement.

[7]
The polyolefin microporous membrane according to any one of [1] to [6], having loads at 160° C. in MD and TD both of 0.10 gf/10 μm or more in TMA measurement.

[8]
The polyolefin microporous membrane according to any one of [1] to [7], having a shutdown temperature of 150° C. or lower when measured at an increasing temperature rate of 15° C./minute.

[9]
The polyolefin microporous membrane according to any one of [1] to [8], having an average pores size determined by a half dry method of 0.05 μm or more and 0.08 μm or less.

[10]
The polyolefin microporous membrane according to any one of [1] to [9], having a difference between a maximum pore size determined by a bubble point method and an average pore size determined by a half dry method of 0.01 μm or more and 0.02 μm or less.

[11]
The polyolefin microporous membrane according to any one of [1] to [10], formed from a polyolefin resin composition in which a polyolefin resin occupies 50% by weight or more and 100% by weight or less of resin components constituting the membrane.

[12]
The polyolefin microporous membrane according to any one of [1] to [11], wherein resin components constituting the membrane comprise polyethylene and polypropylene, and a proportion of the polypropylene is 1% by weight or more and 10% by weight or less based on a total amount of polyolefin resins in the resin components as 100% by weight.

[13]
A separator for a battery comprising the polyolefin microporous membrane according to any one of [1] to [12].

Advantageous Effects of Invention

The present invention can provide a polyolefin microporous membrane which enables to provide a separator which can prevent thermal runaway even if a short-circuit occurs in a battery having a high energy density, which is used for in-vehicle application.

BRIEF DESCRIPTION OF DRAWINGS

FIG. 1 is a graph illustrating one example of temperature dependency of a storage modulus and a loss tangent of a sample for melt viscoelasticity measurement obtained in Example 1.

DESCRIPTION OF EMBODIMENTS

Details of the present invention will be explained in order to exemplify embodiments for carrying out the invention (hereunder referred to as "the present embodiment") and it is to be understood, however, that the invention is not limited to the embodiments below. In the present description, the upper limits and lower limits of the range of various numerals can be arbitrarily combined with each other. Moreover, "to" means that numerals before and after "to" are included as upper limit values and lower limit values unless otherwise specified in the present

DESCRIPTION

<Microporous Membrane>
One aspect of the present invention is a polyolefin microporous membrane. A preferred aspect of the polyolefin microporous membrane is one having a small electron conductivity, ionic conductivity, high resistance to organic solvents, and a fine pore size. Moreover, the polyolefin microporous membrane can be utilized as a separator for batteries or a constituent thereof, particularly as a separator for secondary batteries or a constituent thereof.

The polyolefin microporous membrane according to the present embodiment has a loss tangent (tan δ) at 230° C. of 0.35 or more and less than 0.60 in melt viscoelasticity measurement.

Although not wishing to be bound by theory, it is assumed that when the loss tangent (tan δ) at 230° C. is 0.35 or more in the measurement of melt viscoelasticity, the polyolefin microporous membrane melts due to a temperature rise inside the battery resulting from an internal short-circuit, the molten resin (polyolefin microporous membrane) moderately penetrates into the pores of the electrodes to produce an anchor effect. It is also assumed that since the molten resin stays on site in a state of moderately penetrating into the pores of the electrodes, an increase in the short-circuit area can be inhibited. Similarly, although not wishing to be bound by theory, it is assumed that when the loss tangent (tan δ) at 230° C. is 0.60 or less, the molten resin has a moderate viscosity, so that the flowability thereof is not increased too much, which therefore enables to inhibit an exposure of the electrodes or an increase in the short-circuit area due to outflow of the resin.

Therefore, even the battery having a high energy density can prevent thermal runaway upon internal short-circuit when the polyolefin microporous membrane according to the present embodiment is provided.

In the melt viscoelasticity measurement, the loss tangent (tan δ) at 230° C. is preferably 0.35 or more, more preferably 0.37 or more, and still more preferably 0.39 or more, further still more preferably 0.40 or more, most preferably 0.41 or more, and preferably 0.60 or less, more preferably 0.57 or less, still more preferably 0.54 or less, further still more preferably 0.52 or less, and most preferably 0.50 or less, from the viewpoint of facilitating to prevent thermal runaway upon internal short-circuit.

Moreover, in the melt viscoelasticity measurement, the loss tangent at 190° C. is preferably 0.50 or more and 0.75 or less, more preferably 0.52 or more and 0.73 or less, still more preferably 0.54 or more and 0.71 or less, further still more preferably 0.56 or more and 0.69 or less, and most preferably 0.57 or more and 0.67 or less. It is assumed that when the loss tangent at 190° C. is 0.50 or more, the molten resin (polyolefin microporous membrane) moderately penetrates into the pores of the electrodes to produce an anchor effect, immediately after the internal short-circuit occurs and the temperature rises due to Joule heat, and an increase in the short-circuit area can be inhibited because the molten resin stays on site in a state of moderately penetrating into the pores of the electrodes. Similarly, although not wishing to be bound by theory, it is assumed that when the loss tangent (tan δ) at 190° C. is 0.75 or less, the resin melted immediately after the short-circuit has a moderate viscosity, so that the molten resin does not increase the flowability too much, which enables to inhibit an exposure of electrodes or an increase in the short-circuit area due to the outflow of the resin.

Moreover, in the melt viscoelasticity measurement, the loss tangent at 280° C. is preferably 0.35 or more and 0.60 or less, more preferably 0.37 or more and 0.58 or less, still more preferably 0.39 or more and 0.56 or less, even still more preferably 0.41 or more and 0.54 or less, and most preferably 0.43 or more and 0.52 or less. It is assumed that when the loss tangent at 280° C. is 0.35 or more and the battery reaches an elevated temperature due to an internal short-circuit, the molten resin (polyolefin microporous membrane) moderately penetrates into the pores of the electrodes to provide an anchor effect, and stays on site in a state of moderately penetrating into the pores of the electrodes, which enables to inhibit an increase in the short-circuit area. Similarly, while not wishing to be bound by theory, it is assumed that when the loss tangent (tan δ) at 280° C. is 0.60 or less, the molten resin has a moderate viscosity, so that the flowability of the molten resin is not excessively increased, which enables to inhibit an electrode exposure or increase in the short-circuit area due to the outflow of the resin.

Moreover, in the melt viscoelasticity measurement, the difference between the loss tangent at 190° C. (tan $\delta_{190}$) and the loss tangent at 230° C. (tan $\delta_{230}$) (i.e., tan $\delta_{230}$–tan $\delta_{190}$) is preferably 0.00 or less, more preferably –0.02 or less, still more preferably –0.04 or less, and even still more preferably –0.05 or less, and most preferably –0.08 or less. It is assumed that when the difference (tan $\delta_{230}$–tan $\delta_{190}$) is 0.00 or less, the polyolefin microporous membrane facilitates to prevent an increase in the short-circuit area, because even after the membrane melts in the course of temperature rise at the periphery of short-circuited portion after the short-circuit, the flowability of the membrane is not rapidly increased, and the resin stays on site in a state of moderately having penetrated into the pores of the electrode.

Furthermore, in the melt viscoelasticity measurement, the difference between the loss tangent at 230° C. (tan $\delta_{230}$) and the loss tangent at 280° C. (tan $\delta_{280}$) (i.e., tan $\delta_{280}$–tan $\delta_{230}$) is preferably 0.03 or less, more preferably 0.02 or less, still more preferably 0.01 or less, and even still more preferably 0.00 or less. It is assumed that when the difference (tan $\delta_{280}$–tan $\delta_{230}$) is 0.03 or less and a batter having a high capacity or high density is short-circuited, in the course of an temperature rise of the short-circuited portion to, for example, nearly 300° C., the molten resin tends to be hard to increase the flowability quickly and facilitates to stay at the periphery of the short-circuited portion, which facilitates to prevent an increase in the short-circuit area.

Furthermore, in the melt viscoelasticity measurement, the storage modulus (G') at 230° C. is preferably $1.0 \times 10^4$ Pa or more. It is assumed that when the storage elastic modulus (G') at 230° C. is $1.0 \cdot 10^4$ Pa or more, the polyolefin microporous membrane does not flow quickly even when it melts after a short-circuit, which consequently not only facilitates to prevent short-circuiting between electrodes that are exposed due to outflow or disappearance of the resin, but also facilitates to inhibit thermal runaway. In the melt viscoelasticity measurement, the storage modulus (G') at 230° C. is preferably $1.0 \times 10^4$ Pa or more, more preferably $4.0 \times 10^4$ Pa or more, still more preferably $5.0 \cdot 10^4$ Pa or more, even still more preferably $6.0 \times 10^4$ Pa or more, particularly preferably $6.5 \times 10^4$ Pa or more, and most preferably $7.0 \times 10^4$ Pa or more, from the viewpoint of facilitating to prevent thermal runaway upon internal short-circuit. The storage modulus (G') at 230° C. is also preferably $2.0 \times 10^5$ Pa or less, more preferably $1.8 \times 10^5$ Pa or less, still more preferably $1.6 \times 10^5$ Pa or less, still more preferably $1.4 \times 10^5$ Pa or less, particularly preferably $1.2 \times 10^5$ Pa or less, and most preferably $1.0 \times 10^5$ Pa or less. It is assumed that when the storage modulus (G') is $2.0 \times 10^5$ Pa or less, the polyolefin microporous membrane generates a moderate viscosity after melting thereof due to the temperature rise following a short-circuit, to facilitate to produce an anchor effect, and consequently the molten resin facilitates to stay on site in a state of moderately having penetrated into the pores of the electrodes, which facilitates to inhibit an increase in the short-circuit area.

Moreover, in the melt viscoelasticity measurement, the storage modulus (G') at 190° C. is preferably $1.0 \times 10^4$ Pa or more. It is assumed that when the storage modulus (G') at 190° C. is $1.0 \times 10^4$ Pa or more, the resin that melted immediately after the short-circuit has a moderate viscosity, so that the flowability of the molten resin is not increased too much, which enables to inhibit an exposure of the electrodes or an increase in the short-circuit area due to the resin outflow. In the melt viscoelasticity measurement, the storage modulus (G') at 190° C. is preferably $1.0 \times 10^4$ Pa or more, more preferably $3.0 \times 10^4$ Pa or more, still more preferably $4.0 \times 10^4$ Pa or more, even still more preferably $5.0 \times 10^4$ Pa or more, particularly preferably $5.5 \times 10^4$ Pa or more, and most preferably $6.0 \times 10^4$ Pa or more, from the viewpoint of facilitating to prevent thermal runaway upon internal short-circuit. Further, the storage modulus (G') at 190° C. is preferably $1.8 \times 10^5$ Pa or less, more preferably $1.6 \times 10^5$ Pa or less, still more preferably $1.4 \times 10^5$ Pa or less, even still more preferably $1.2 \times 10^5$ Pa or less, particularly preferably $1.0 \times$ $10^5$ Pa or less, and most preferably $8.0 \times 10^4$ Pa or less. Similarly, while not wishing to be bound by theory, it is assumed that when the storage modulus (G') is $1.8 \times 10^5$ Pa or less, immediately after an internal short-circuit occurs and the temperature rises due to Joule heat, the molten resin (polyolefin microporous membrane) moderately penetrates into the pores of the electrodes to produce an anchor effect, and then stays on site in a state of moderately having penetrated into the pores of the electrode, which enables to inhibit an increase in the short-circuit area.

Moreover, in the melt viscoelasticity measurement, the storage modulus (G') at 280° C. is preferably $1.0 \times 10^4$ Pa or more. It is assumed that when the storage modulus (G') at 280° C. is $1.0 \times 10^4$ Pa or more, since the molten resin has a moderate viscosity when the battery is heated to an elevated temperature and the flowability of the molten resin is not increased too much, and thereby an exposure of the electrode or an increase in the short-circuit area due to the outflow of the resin, can be inhibited. In the melt viscoelasticity measurement, the storage modulus (G') at 280° C. is preferably $1.0 \times 10^4$ Pa or more, more preferably $3.0 \times 10^4$ Pa or more, still more preferably $4.0 \times 10^4$ Pa or more, even still more preferably $5.0 \times 10^4$ Pa or more, particularly preferably $5.5 \times 10^4$ Pa or more, and most preferably $6.0 \times 10^4$ Pa or more, from the viewpoint of facilitating to prevent thermal runaway upon internal short-circuit. Moreover, the storage modulus (G') at 280° C. is preferably $1.8 \times 10^5$ Pa or less, more preferably $1.6 \times 10^5$ Pa or less, still more preferably $1.4 \times 10^5$ Pa or less, even still more preferably $1.2\text{-}10^5$ Pa or less, particularly preferably $1.0 \times 10^5$ Pa or less, and most preferably $8.0 \times 10^4$ Pa or less. Similarly, while not wishing to be bound by theory, it is assumed that when the storage modulus (G') at 280° C. is $1.8 \times 10^5$ Pa or less and a battery reaches an elevated temperature, the molten resin (polyolefin microporous membrane) moderately penetrates into the pores of the electrodes to exhibit an anchor effect and then stays on site in a state of moderately having penetrated into the pores of the electrodes, which enables to inhibit an increase in the short-circuit area.

In the melt viscoelasticity measurement, the difference between the storage modulus at 190° C. ($G'_{190}$) and the storage modulus at 230° C. ($G'_{230}$) (i.e., $G'_{230} - G'_{190}$) is preferably $-1.0 \times 10^3$ Pa or more, more preferably 0 Pa or more, still more preferably $1.0 \times 10^3$ Pa or more, even still more preferably $2.0 \times 10^3$ Pa or more, and most preferably at least $2.5 \times 10^3$ Pa or more. In is assumed that when the difference ($G'_{230} - G'_{190}$) is $-1.0 \times 10^3$ Pa or more, the resin facilitates to prevent an increase in the short-circuit area because in the course of raising a temperature in the periphery of the short-circuited portion after a short-circuit, the molten resin tends to hardly increase the flowability thereof quickly and facilitates to stay in the periphery of the short-circuited portion.

In the measurement of melt viscoelasticity, the difference between the storage modulus at 230° C. ($G'_{230}$) and the storage modulus at 280° C. ($G'_{280}$) (i.e., $G'_{280} - G'_{230}$) is preferably $-2.1 \times 10^4$ Pa or more, more preferably $-1.9 \times 10^4$ Pa or more, still more preferably $-1.7 \times 10^4$ Pa or more, even still more preferably $-1.5 \times 10^4$ Pa or more, particularly preferably $-1.3\text{-}10^4$ Pa or more, and most preferably $-1.1 \times 10^4$ Pa or more. It is assumed that when the difference ($G'_{280} - G'_{230}$) is $-2.1 \times 10^4$ Pa or more and a battery having a high capacity or high density is short-circuited, the molten resin tends to hardly increase the flowability thereof quickly in the course of the temperature rise of the short-circuited portion to, for example, nearly 300° C., and facilitates to stay in the periphery of the short-circuited portion, which thereby facilitates to prevent an increase in the short circuit area.

The storage modulus (G') and/or loss tangent (tan δ) at 190° C., 230° C. and 280° C. each can be adjusted in the manner as explained above, by controlling various production conditions (for example, the production conditions described in Table 1) such as selection of polyolefin raw materials which are to be used, specific energy upon melt-kneading, polymer concentration or kneading temperature upon melt-kneading, strain rate upon stretching, etc.

There may be a difference between the value obtained in the case where the melt viscoelasticity of the microporous polyolefin membrane was measured and the value obtained in the case where the melt viscoelasticity of a polyolefin resin as a raw material of the polyolefin microporous membrane was measured. Moreover, there are methods that are capable of measuring a melt viscoelasticity of a polyolefin resin as a raw material but are not appropriate in measuring a melt viscoelasticity of a microporous polyolefin membrane. Therefore, in the present embodiment, the storage modulus (G') and the loss tangent (tan δ) are each measured by the method described in Examples.

In the present embodiment, not for a polyolefin resin as a raw material, but for a polyolefin microporous membrane, various parameters obtained by measuring the melt viscoelasticity thereof are controlled within a specific range, from which various parameters of the separator in the battery can be controlled within a specific range, and thus, thermal runaway can be prevented upon an internal short-circuit.

Moreover, the maximum loads in MD and TD in thermomechanical analysis (TMA) measurement are both preferably 3.0 gf or less. Although not wishing to be bound by theory, it is assumed that when the maximum loads in MD and TD in TMA measurement is 3.0 gf or less, an increase in the short-circuit area due to thermal shrinkage of the separator in the periphery of the short-circuited portion is facilitated to be prevented and is unlikely to bring about the thermal runaway of a battery upon an internal short-circuit. The maximum loads for both in MD and TD in TMA measurement are preferably 3.0 gf or less, more preferably 2.9 gf or less, still more preferably 2.8 gf or less, even still more preferably 2.7 gf or less, particularly preferably 2.6 gf or less, most preferably 2.5 gf or less, and preferably 0.1 gf or more. When the maximum loads for both in MD and TD in the TMA measurement is 0.1 gf or more, the shape of the cell is maintained by tightening of a wound separator due to the shrinkage stress of the separator when a temperature rises due to an internal short-circuit. Further, the maximum load in MD in the TMA measurement is preferably 2.5 gf or less, more preferably 2.3 gf or less, and the maximum load in TD is preferably 2.0 gf or less, and more preferably 1.8 gf or less.

Moreover, the total of the maximum load in MD and the maximum load in TD in the TMA measurement is preferably 5.5 gf or less. Although not wishing to be bound by theory, it is presumed that the total of the maximum loads in MD and TD in the TMA measurement of 5.0 gf or less tends to facilitate prevention of an increase in the short-circuit area due to thermal shrinkage of the separator in the periphery of the short-circuit portion, and thus is unlikely to cause the thermal runaway of a battery upon an internal short-circuit. The total of the maximum load in MD and the maximum load in TD in the TMA measurement is preferably 5.5 gf or less, more preferably 5.3 gf or less, still more preferably 5.1 gf or less, even still more preferably 4.9 gf or less, particularly preferably 4.7 gf or less, even particularly preferably 4.5 gf or less, 4.2 gf or less, or 3.9 gf or less, and most preferably 1.0 gf or more. It is assumed that when the sum of the maximum load in MD and the maximum load in TD in the TMA measurement is 1.0 gf or more, the cell shape is maintained due to tightening of a wound separator due to the shrinkage stress of the separator when a temperature rises accompanied by an internal short-circuit.

Moreover, the loads in MD and TD at 160° C. (loads per 10 μm of membrane thickness) in the TMA measurement are preferably 0.05 gf or more, more preferably 0.10 gf or more, still more preferably 0.15 gf or more, even still more preferably 0.20 gf or more, most preferably 0.25 gf or more, and preferably 1.0 gf or less, more preferably 0.7 gf or less, and still more preferably 0.5 gf or less. It is indicated that when the loads in MD and TD at 160° C. is 0.05 gf or more, the polyolefin resin tends to hardly rupture completely even after the melting thereof and is prone to maintain the shape. Therefore, it is assumed that when the loads in MD and TD at 160° C. in the TMA measurement are 0.05 gf or more, the micromembrane rupture hardly occurs even when a temperature in the periphery of the short-circuited portion reaches around 160° C. due to the temperature rise in short-circuiting of a battery, which facilitates to prevent the thermal runaway due to the short-circuited portion that is newly generated. Moreover, when the loads in MD and TD at 160° C. in the TMA measurement are 1.0 gf or less, the membrane tends to hardly shrink further when a temperature reaches an elevated temperature of 160° C. or higher, which thereby facilitates to prevent a short-circuit due to thermal shrinkage.

Moreover, in the TMA measurement, the ratio of a maximum load in MD to a maximum load in the TD (a maximum load in MD/a maximum load in TD) is preferably 0.75 or more and 1.5 or less, more preferably 0.80 or more and 1.45 or less, still more preferably 0.85 or more and 1.40 or less, and even still more preferably 0.90 or more and 1.35 or less. The ratio (the maximum load in MD/the maximum load in TD) of 0.75 or more and 1.5 or less facilitates to inhibit an increase in the short-circuit area because of generation of cracks due to the anisotropy.

The maximum loads in MD and TD in the TMA measurement and the loads at 160° C., can be adjusted in the manner as explained above by various production conditions (for example, the production conditions described in Table 1) such as a biaxial stretching temperature, biaxial stretching ratio, relaxation ratio upon heat setting, relaxation strain rate upon heat setting, control of relaxation temperature upon heat setting or selection of polyolefin raw materials, etc. These TMA measurements are carried out by the method described in Examples.

The shutdown temperature measured at an increasing temperature rate of 15° C./min is preferably 150° C. or lower. When the shutdown temperature measured at an increasing temperature rate of 15° C./min is 150° C. or lower, the thermal runaway is facilitated to be inhibited by instantaneously increasing the internal resistance at the time of a sudden rise in temperature upon a short-circuit. The shutdown temperature measured at an increasing temperature rate of 15° C./min is preferably 150° C. or lower, more preferably 149° C. or lower, still more preferably 148° C. or lower, even still more preferably 147° C. or lower, most preferably 146° C. or lower, and preferably 130° C. or higher, more preferably 133° C. or higher, still more preferably 135° C. or higher, even still more preferably 137° C. or higher, and particularly preferably 139° C. or higher. It is assumed that the shutdown temperature of 130° C. or higher facilitates to prevent the thermal runaway due to melting and outflow of the resin at a lowered temperature.

The shutdown temperature measured at an increasing temperature rate of 15° C./min can be adjusted in the manner as explained above by controlling various production conditions (for example, the production conditions described in Table 1) such as selection of polyolefin materials which are to be used, specific energy upon melt-kneading, polymer concentration or kneading temperature upon melt-kneading, strain rate upon stretching, etc. The shutdown temperature is measured by the method described in Examples.

The constituents of the microporous polyolefin membrane and preferred embodiments will be described below.

[Constituents]

The polyolefin microporous membrane includes, for example, porous membranes containing polyolefin resins, porous membranes containing resins such as polyethylene terephthalate, polycycloolefin, polyether sulfone, polyamide, polyimide, polyimide amide, polyaramid, polycycloolefin, nylon, polytetrafluoroethylene, etc., woven fabric (woven cloth) of polyolefin-based fibers, nonwoven fabric of polyolefin-based fibers, paper, and aggregates of insulating substance particles. Among them, a porous membrane containing a polyolefin resin (hereinafter, also referred to as a "polyolefin resin porous membrane") is preferred in order to obtain a multilayer porous membrane, i.e., a separator for secondary batteries via a coating step, which has excellent coatability of the coating solution, and makes a thickness of the separator thinner than that of a conventional separator, to increase an active material ratio in a power storage device such as a secondary battery and to increase a capacity per volume.

The polyolefin resin porous membrane will be described.

The polyolefin resin porous membrane is preferably a porous membrane formed by a polyolefin resin composition occupying 50% by weight or more and 100% by weight or less of the resin component constituting the porous membrane, from the viewpoint of improving shutdown performance, etc., when used as a separator for secondary batteries. The proportion occupied by the polyolefin resin in the polyolefin resin composition is more preferably 60% by weight or more and 100% by weight or less, and still more preferably 70% by weight or more and 100% by weight or less.

The polyolefin resin contained in the polyolefin resin composition is not particularly restricted, and includes, for example, homopolymers, copolymers, or multistage polymers, etc., obtained by using ethylene, propylene, 1-butene, 4-methyl-1-pentene, 1-hexene, 1-octene, etc., as monomers. Moreover, these polymers may be used alone or in combination of two or more.

Among the polyolefin resins, polyethylene, polypropylene, copolymers thereof and mixtures thereof are preferred from the viewpoint of shutdown characteristics when the polyolefin resin porous membrane is used as separators for secondary batteries.

Such a polyethylene includes low density polyethylene (LDPE), linear low density polyethylene (LLDPE), medium density polyethylene (MDPE), high density polyethylene (HDPE), high molecular weight polyethylene (HMWPE), ultrahigh molecular weight polyethylene (UHMWPE), etc.

Such a polypropylene includes isotactic polypropylene, syndiotactic polypropylene, atactic polypropylene, etc.

Such a copolymer includes an ethylene-propylene random copolymer, ethylene-propylene rubber, etc.

From the viewpoint of terminating a thermal runaway of a battery at an early stage, the polyolefin resin preferably comprises polyethylene having a melting point in the range of 130° C. to 140° C. as a main component.

In the present description, the high molecular weight polyethylene refers to a polyethylene having a viscosity-average molecular weight (Mv) of 100,000 or more. The Mv for polyethylene can be calculated by measuring the intrinsic viscosity [η] (dl/g) at 135° C. in a decalin solvent based on ASTM-D4020, and according to the following equation:

$$[\eta]=6.77\times10^{-4}Mv^{0.67}$$

In general, ultrahigh molecular weight polyethylene has a Mv of 1,000,000 or more, and the definition of the high molecular weight polyethylene (HMWPE) in the present description includes UHMWPE. Moreover, even if the polyethylene refers to "ultrahigh molecular weight polyethylene" based on a definition different from the aforementioned definition and the polyethylene has a Mv of 100,000 or more, it probably corresponds to the high molecular weight polyethylene in the present embodiment.

In the present description, the high density polyethylene refers to a polyethylene having a density of 0.942 to 0.970 g/cm³. In the present invention, the density of polyethylene refers to a value measured according to D) density gradient tube method described in JIS K7112 (1999).

From the viewpoint of satisfying the required performance of a low melting point and high strength of the polyolefin resin porous membrane when it is used as a separator for secondary batteries, it is preferable to use polyethylene, particularly high density polyethylene, as the polyolefin resin. Furthermore, from the viewpoint of exhibiting prompt fuse behavior, the main component of the polyolefin resin porous membrane is preferably polyethylene. The "main component of the polyolefin resin porous membrane is polyethylene" refers to a polyethylene contained in an amount of more than 50% by weight relative to the total weight of the polyolefin resin porous membrane. Polyethylene is preferably 75% by weight or more, more preferably 85% by weight or more, still more preferably 90% by weight or more, even still more preferably 95% by weight or more, and most preferably 98% by weight or more based on the total weight of the polyolefin resin porous membrane, and it may be 100% by weight.

The viscosity-average molecular weight (hereinafter, Mv) of the polyolefin resin used as a raw material of the polyolefin microporous membrane is preferably 50,000 or more and less than 5,000,000, more preferably 80,000 or more and less than 2,000,000, and still more preferably 100,000 or more and less than 1,000,000. When the viscosity-average molecular weight is 50,000 or more, uniform melt-kneading is facilitated, and sheet moldability, particularly thickness stability is excellent. Further, when used as a separator for secondary batteries and the viscosity-average molecular weight is less than 5,000,000, the pores are easily clogged up when a temperature rises and a favorable shutdown function is likely to be obtained, which is preferred.

As a raw material for the microporous polyolefin membrane, a plurality of polyolefin raw materials may be mixed and used. When a plurality of polyolefin raw materials are used as a mixture, polyethylene having Mv of 100,000 or more and 300,000 or less and polyethylene having Mv of 500,000 or more and less than 1,000,000, are preferably contained. By containing polyethylene having Mv of 100,000 or more and 300,000 or less, the viscosity is not increased too much upon melt-kneading and a decrease in the molecular weight of the polyolefin can be inhibited, which tends to reduce thermal shrinkage so that the excessive residual stress does not remain upon melt-kneading. Moreover, the pores are prone to be clogged up when a temperature rises, and a favorable shutdown function tends to be obtained. Furthermore, it is assumed that the polyolefin microporous membrane is likely to become viscous when it melts to facilitate to produce an anchor effect by moderately penetrating into the electrode upon melting after the short-circuit of a battery, which facilitates to inhibit an increase in the short-circuit area by inhibition of the thermal shrinkage. By containing polyethylene having Mv of 500,000 or more and less than 1,000,000, the stress increases upon melt-kneading, which allows the resin to be uniformly kneaded. Moreover, it is assumed that since an interpolymer entanglement of the polyolefin microporous membrane is generated, it tends to have a high strength as well as the resin facilitates to stay on site without an outflow thereof so that the viscosity thereof does not drop too much when the polyolefin microporous membrane melts and reaches an elevated temperature near 300° C., which therefore facilitates inhibition of the thermal runaway.

The proportion of the polyethylene having Mv of 100,000 to 300,000 used as a raw material of the polyolefin microporous membrane is preferably 10% by weight or more and 40% by weight or less, more preferably 12% by weight or more and 38% by weight or less, still more preferably 14% by weight or more and 36% by weight or less, even still more preferably 16% by weight or more and 34% by weight or less, and most preferably 18% by weight or more and 32% by weight or less (or 18% by weight or more and less than 30% by weight or less) when the total amount of the polyolefin raw materials is 100% by weight. When the ratio of polyethylene having Mv of 100,000 or more and 300,000 or less is 10% by weight or more, the effect of inhibiting an increase in the short-circuit area tends to be obtained by the favorable shutdown characteristics, thermal shrinkage inhibition effect, and moderate viscosity when a temperature reaches an elevated temperature. When the proportion of the polyethylene having Mv of 100,000 or more and 300,000 or less is 40% by weight or less, the interpolymer entanglement upon melt-kneading tends to be produced. Moreover, the flowability of the resin is not also increased too much when the polyolefin microporous membrane reaches an elevated temperature, which tends to allow thermal runaway due to an exposure of the electrodes resulting from the resin outflow to be avoided.

The proportion of the polyethylene having Mv of 500,000 or more and less than 1,000,000 used as a raw material of the polyolefin microporous membrane is preferably 40% by weight or more and 90% by weight or less, more preferably 45% by weight or more and 85% by weight or less, still more preferably 50% by weight or more and 80% by weight or less, even still more preferably 55% by weight or more and 75% by weight or less, and most preferably 62% by weight or more and 73% by weight or less, when the total amount of the polyolefin raw materials is 100% by weight. When the proportion of the polyethylene having Mv of 500,000 or more and less than 1,000,000 is 40% by weight or more, the effect of increasing the strength of the microporous polyolefin membrane and inhibiting thermal runaway without the outflow of the resin when a temperature reaches an elevated temperature, can be exhibited. When the proportion of the polyethylene having Mv of 500,000 or more and less than 1,000,000 is 90% by weight or less, the thermal shrinkage tends to be small without the excessive residual stress upon stretching. Moreover, it is assumed that since not only the pores are likely to be clogged up when a temperature rises and a favorable shutdown function tends to be obtained, but also the polyolefin microporous membrane becomes viscous when it melts, the membrane moderately penetrates into the electrodes to produce an anchor effect when it melts after a short-circuit of a battery, which facilitates to inhibit an increase in the short circuit area by inhibition of thermal shrinkage.

When ultrahigh molecular weight polyethylene having Mv of 1,000,000 or more is contained as a raw material of the microporous polyolefin membrane, it is preferably less than 20% by weight, more preferably less than 15% by weight, still more preferably less than 10% by weight, even still more preferably less than 7% by weight or less than 5% by weight, when the total amount of the polyolefin raw materials is 100% by weight, and most preferably no ultrahigh molecular weight polyethylene having Mv of 1,000,000 or more is contained. When the proportion of the ultrahigh molecular weight polyethylene having Mv of 1,000,000 or more is less than 20% by weight, a decrease in the molecular weight of the polymer due to excessive entanglement upon melt-kneading tends to be inhibited. Moreover, it is assumed that not only the residual stress of the microporous polyolefin membrane can be inhibited, but also it moderately penetrates into the electrodes upon melting thereof to be prone to produce an anchor effect, which facilitates to inhibit an increase in the short-circuit area when a temperature reaches an elevated temperature after a short-circuit of a battery.

When low density polyethylene is contained as a raw material of the microporous polyolefin membrane, it is preferably 10% by weight or less, more preferably 8% by weight or less, still more preferably 6% by weight or less or 5% by weight or less, even still more preferably 4% by weight or less (or less than 3% by weight, further less than 1% by weight), when the total amount of the polyolefin raw materials is preferably 100% by weight, and most preferably no low density polyethylene is contained. When the proportion of the low density polyethylene is 10% by weight or less, the polyolefin microporous membrane tends to be hard to rupture easily when a temperature reaches an elevated temperature of around 150° C., and the flowability of the molten resin does not become too large when a temperature reaches an elevated temperature of nearly 300° C. and the thermal runaway due to an exposure of the electrodes resulting from the outflow of the resin tends to be avoided. For the same reason, low molecular weight polyethylene having Mv of less than 50,000 may be contained provided that the effect of the present invention is not significantly impaired, and the content thereof is, for example, the same as that of the low density polyethylene. The low molecular weight polyethylene having Mv of less than 50,000 is preferably not contained.

From the viewpoint of improving the heat resistance of the porous membrane, a mixture of polyethylene and polypropylene may be used as the polyolefin resin. The proportion of polypropylene used as a raw material for the polyolefin microporous membrane is preferably 1% by weight or more and 10% by weight or less, more preferably 3% by weight or more and 10% by weight or less, still more preferably 4% by weight or more (or more than 4% by weight) and 9% by weight or less, even still more preferably 5% by weight or more and 8% by weight or less, and most preferably more than 5% by weight and less than 8% by weight, when the total amount of the polyolefin raw materials is 100% by weight.

Accordingly, the proportion of the polypropylene is preferably 1% by weight or more and 10% by weight or less, more preferably 3% by weight or more and 10% by weight or less, still more preferably 4% by weight or more (or more than 4% by weight) and 9% by weight or less, even still more preferably 5% by weight or more and 8% by weight or less, and most preferably more than 5% by weight and less than 8% by weight, when the total amount of the polyolefin resins in the resin component constituting the membrane is 100% by weight.

When the proportion of the polypropylene is 1% by weight or more, the polyolefin microporous membrane is hard to rupture easily when a temperature reaches an elevated temperature of around 150° C., and a fine pinhole is hardly formed at an initial stage of a battery short-circuit. When the proportion of the polypropylene is 10% by weight or less, the flowability of the molten resin does not to become too large when a temperature reaches close to 300° C., which facilitates to avoid the thermal runaway due to an exposure of the electrode resulting from an outflow of the resin or excessive penetration thereof into the electrodes.

The Mv of the polypropylene used as a raw material of the microporous polyolefin membrane is preferably 200,000 or more and 1,000,000 or less, more preferably 250,000 or more and 900,000 or less, still more preferably 300,000 or more and 800,000 or less. Although not wishing to be bound by any theory, it is assumed that when the Mv of the polypropylene is 200,000 or more, an interpolymer entanglement upon melt-kneading is strengthened to uniformly disperse polypropylene in polyethylene, so that the heat resistance of the polypropylene is effectively exhibited. Further, when the polyolefin microporous membrane also reaches an elevated temperature close to 300° C., the viscosity is not excessively increased, which is preferred. When the Mv of the polypropylene is 1,000,000 or less, a decrease in the molecular weight of the polymer due to excessive entanglement upon melt-kneading, and the residual stress of the microporous polyolefin membrane are facilitated to be inhibited.

The Mv of polypropylene can be calculated by measuring intrinsic viscosity [1] (dl/g) at 135° C. in a decalin solvent based on ASTM-D4020, and according to the following equation:

$$[\eta] = 1.10 \times 10^{-4} \, Mv^{0.80}$$

The polypropylene used as a raw material of the microporous polyolefin membrane is preferably homopolymers from the viewpoint of improving heat resistance and melt viscosity at elevated temperatures. Among them, isotactic polypropylene is preferable. The amount of isotactic polypropylene is preferably 90% by weight or more, more preferably 95% by weight or more, still more preferably 98% by weight or more, and even still more preferably 100% by weight (i.e., all), relative to the total weight of polypropylene in the microporous polyolefin membrane. When the isotactic polypropylene is 90% by weight or more, further melting of the microporous membrane due to an increase in temperature upon a short-circuit, can be inhibited. Furthermore, since isotactic polypropylene has high crystallinity, phase separation from a plasticizer easily proceeds, and a membrane having favorable porosity and high permeability tends to be obtained, which therefore enables to favorably influence on an output or cycle characteristics. Furthermore, the homopolymer has few amorphous portions and enables to inhibit an increase in thermal shrinkage when heat not greater than the melting point is applied or when the amorphous portion shrinks due to the residual stress, and the problem of an increase in the short-circuit area due to shrinkage of the amorphous portion when a temperature reaches about 100° C. is facilitated to be inhibited.

The polyolefin resin that may be contained in the polyolefin raw materials and the content thereof are not limited to the aforementioned explanation. Therefore, the polyolefin raw material may contain a polyolefin resin different from that described above provided that the effect of the present invention is not significantly impaired, or the content may be different from that described above.

The polyolefin resin composition may contain arbitrary additives. The additives include polymers other than polyolefin resins; inorganic fillers; antioxidants such as phenolic-based, phosphorus-based, sulfur-based antioxidants, etc.; metal soaps such as calcium stearate, zinc stearate, etc.; ultraviolet absorbers; light stabilizers; antistatic agents; antifogging agents; coloring pigments, etc. The total amount of these additives is preferably 20% by weight or less with respect to 100% by weight of the polyolefin resin from the viewpoint of improving shutdown performance, etc., more preferably 10% by weight or less, and still more preferably 5% by weight or less.

From the viewpoint of the physical properties or raw material properties of the polyolefin resin porous membrane, the polyolefin raw material preferably has a ratio of a weight-average molecular weight (Mw) to a number-average molecular weight (Mn) (i.e., molecular weight distribution: Mw/Mn) of 1.0 or more and 15.0 or less, more preferably 3.0 or more and 12.0 or less, and still more preferably 5.0 or more and 9.0 or less. The weight-average molecular weight (Mw) and molecular weight distribution (Mw/Mn) are measured by the method described in Examples.

<Other Properties>

The microporous polyolefin membrane of the present embodiment preferably has a puncture strength (gf/μm) per 1 μm membrane thickness of 17 gf/μm or more, more preferably 18 gf/μm or more, still more preferably 19 gf/μm or more, and preferably 60 gf/μm or less, more preferably 50 gf/μm or less, still more preferably 40 gf/μm or less, even still more preferably 35 gf/μm or less, and most preferably 30 gf/μm or less. When the puncture strength is 17 gf/μm or more and a battery using a microporous polyolefin membrane is fabricated, micro thinning or membrane rupture can be avoided when the membrane contacts with unevenness of the electrode surface, and the battery failure can be inhibited due to a micro short-circuit. When the puncture strength is 60 gf/μm or less, the shrinkage stress of the battery can be inhibited. The puncture strength (gf/μm) is measured by the method described in Examples.

The microporous polyolefin membrane of the present embodiment preferably has an air permeability (sec/100 cm$^3$) of 30 sec/100 cm$^3$ or longer, more preferably 40 sec/100 cm$^3$ or longer, still more preferably 50 sec/100 cm$^3$ or longer, even still more preferably 60 sec/100 cm$^3$ or longer, and preferably 500 sec/100 cm$^3$ or shorter, more preferably 400 sec/100 cm$^3$ or shorter, still more preferably 300 sec/100 cm$^3$ or shorter, even still more preferably 200 sec/100 cm$^3$ or shorter, and most preferably 100 sec/100 cm$^3$ or shorter. When the air permeability is 30 sec/100 cm$^3$ or longer, self-discharge can be inhibited. When the air permeability is 500 sec/100 cm$^3$ or shorter, an output of a battery can be secured. The air permeability (sec/100 cm$^3$) is measured by the method described in Examples.

<Tensile Strength at Break and Tensile Elongation>

The microporous polyolefin membrane of the present embodiment has tensile strengths at break in MD and TD of preferably 0.1 kgf or more and 2.0 kgf or less, more preferably 0.3 kgf or more and 1.7 kgf or less, still more preferably 0.5 kgf or more and 1.5 kgf or less, and most preferably 0.7 kgf or more and 1.3 kgf or less. When the tensile strengths at break in MD and TD are 0.1 kgf or more, the possibility that a separator ruptures when a battery is deformed by external force, can be reduced. When the tensile strengths at break in MD and TD are 2.0 kgf or less, the residual stress can be reduced, which facilitates to prevent an increase in the short-circuit area by inhibition of heat shrinkage, which is preferable. The tensile strength at break (kgf) is measured by the method described in Examples.

The microporous polyolefin membrane of the present embodiment has tensile elongations in MD and TD of preferably 30% or more, more preferably 40% or more, still more preferably 50% or more, and even still more preferably 60% or more. The tensile elongations in MD and TD of 30% or more enable to reduce the possibility that a separator ruptures when a battery is deformed by external force, etc. Moreover, it also enables to reduce the possibility of battery failure due to a micro-short-circuiting via pinholes in the polyolefin microporous membrane created by distortion of a micro segment generated when the polyolefin microporous membrane and the electrode are laminated in the presence of fine foreign substances. The tensile elongation (%) is measured by the method described in Examples.

The polyolefin microporous membrane of the present embodiment has the ratio of a tensile elongation at break in MD to a tensile elongation in TD (a tensile elongation in MD/a tensile elongation in TD) of preferably 0.70 or more and 1.5 or less, more preferably 0.75 or more and 1.45 or less, still more preferably 0.80 or more and 1.40 or less, and even still more preferably 0.85 or more and 1.35 or less. The ratio of the tensile elongation in MD to the tensile elongation in TD of 0.70 or more and 1.5 or less enables to inhibit generation of the cracks due to anisotropy in the presence of fine foreign substances that is concerned in a microporous membrane characteristic of low shrinkage stress.

The thickness of the polyolefin microporous membrane is preferably 0.5 μm or more and 100 μm or less, more preferably 1 μm or more and 50 μm or less, still more preferably 3 μm or more and 25 μm or less, even still more preferably 4 μm or more and 15 μm or less, particularly preferably 5 μm or more and 12 μm or less, and most preferably 8 μm or more and 11 μm or less. The thickness of the polyolefin microporous film is preferably 0.1 μm or more from the viewpoint of mechanical strength and insulation retention upon a short-circuit, and is preferably 100 μm or less from the viewpoint of increasing a capacity of LIB. The thickness of the entire polyolefin microporous membrane can be adjusted, for example, by controlling a die lip gap, a stretching ratio in the stretching step, etc.

The average pore size of the polyolefin microporous membrane is preferably 0.01 μm or more, more preferably 0.02 μm or more, still more preferably 0.03 μm or more, even still more preferably 0.04 μm or more, particularly preferably 0.045 μm or more, most preferably 0.050 μm or more, and preferably 0.70 μm or less, more preferably 0.20 μm or less, still more preferably 0.15 μm or less, even still more preferably 0.10 μm or less, particularly preferably 0.08 μm or less, and most preferably 0.065 μm or less. When the average pore size is 0.01 μm or more, it is preferable that the membrane has favorable ion conductivity. The average pore size of 0.70 μm or less is desirable from the viewpoint of enabling to prevent reduction of cycle characteristics or self-discharge due to clogging by a by-product in a battery. The average pore size can be adjusted by controlling the composition ratio of the polyolefin, biaxial stretching temperature, stretching ratio, heat setting temperature, stretching ratio upon heat setting, and relaxation ratio upon heat setting, and by combining these. The above average pore size (μm) is measured by the method described in Examples.

The maximum pore size of the polyolefin microporous membrane is preferably 0.02 μm or more, more preferably 0.03 μm or more, still more preferably 0.04 μm or more, even still more preferably 0.05 μm or more, particularly preferably 0.06 μm or more, further particularly preferably 0.065 μm or more, most preferably 0.070 μm or more, and preferably 1.00 μm or less, more preferably 0.30 μm or less, still more preferably 0.20 μm or less, even still more preferably 0.15 μm or less, particularly preferably 0.10 μm or less, further particularly preferably 0.090 μm or less, and most preferably 0.080 μm or less. The maximum pore diameter of 0.02 μm or more is preferable since favorable ion conductivity and cycle characteristics are obtained. The maximum pore size of 1.00 μm or less is desirable from the viewpoint of capable of preventing reduction of cycle characteristics or self-discharge due to clogging by a by-product in the battery. The maximum pore size (μm) is measured by the method described in Examples.

The difference between the maximum pore size and the average pore size of the polyolefin microporous membrane (the maximum pore size–the average pore size) is preferably 0.001 μm or more, more preferably 0.003 μm or more, and still more preferably 0.005 μm or more, even still more preferably 0.008 μm or more, particularly preferably 0.01 μm or more, from the viewpoint of favorable cycle characteristics, and it is preferably 0.3 μm or less, more preferably 0.1 μm or less, still more preferably 0.05 μm or less, even still more preferably 0.03 μm or less, and particularly preferably 0.02 μm or less. It is assumed that when the difference between the maximum pore size and the average pore size is within the above range, that the segregation of lithium ion concentration hardly occurs and cycle characteristics become favorable.

The porosity of the microporous polyolefin membrane is preferably 25% or more and 95% or less, more preferably 30% or more and 65% or less, still more preferably 35% or more and 55% or less, and most preferably 40% or more and 50% or less. The porosity of the polyolefin microporous membrane is preferably 25% or more from the viewpoint of improving ionic conductivity and is preferably 95% or less from the viewpoint of voltage resistance characteristics. The porosity of the microporous polyolefin membrane is adjusted by controlling the mixing ratio of the polyolefin resin composition and the plasticizer, biaxial stretching temperature, stretching ratio, heat setting temperature, stretching ratio upon heat setting, and relaxation ratio upon heat setting, and by combining these. The aforementioned porosity is measured by the method described in Examples.

<Production Method of Polyolefin Microporous Membrane>>

Methods for producing a polyolefin microporous membrane are not particularly restricted, and publicly known production methods can be used. The method includes, for example, the following methods:

(1) A method comprising melt-kneading a polyolefin resin composition and a pore-forming material to mold them into a sheet, optionally stretching the sheet, and then extracting the pore-forming material therefrom to produce a porous sheet;

(2) A method comprising melt-kneading a polyolefin resin composition, extruding it at a high stretching ratio, and heat treating and stretching it to strip polyolefin spherulite interfaces to make it porous;

(3) A method comprising melt-kneading a polyolefin resin composition and an inorganic filler to mold them into a sheet, stretching the sheet to strip interfaces between the polyolefin and the inorganic filler to make it porous;

(4) A method comprising dissolving a polyolefin resin composition and then immersing it in a poor solvent for the polyolefin to solidify the polyolefin and simultaneously remove the solvent, thereby make it porous.

Hereinafter, as an example of the methods for producing a polyolefin microporous membrane, the method (1), a polyolefin resin composition and a pore-forming material are melt-kneaded to be molded into a sheet and the pore-forming is extracted therefrom, will be described.

First, the polyolefin resin composition and the pore-forming material are melt-kneaded. A method for melt-kneading includes, for example, a method comprising feeding a polyolefin resin and, optionally other additives into a resin-kneading apparatus, such as an extruder, kneader, laboplastomill, kneading roll, Banbury mixer, etc., and introducing and kneading a pore-forming material at an arbitrary ratio while heat-melting the resin components.

The pore-forming material may include a plasticizer, an inorganic material, or combination thereof.

Although the plasticizer is not particularly restricted, a non-volatile solvent that can form a uniform solution above the melting point of polyolefin, is preferably used. Such a non-volatile solvent include, for example, hydrocarbons such as liquid paraffin, paraffin wax, etc.; esters such as dioctyl phthalate, dibutyl phthalate, etc.; and higher alcohols such as oleyl alcohol, stearyl alcohol, etc. These plasticizers may be recovered by distillation, etc., after extraction and reutilized. Furthermore, the polyolefin resin, other additive and plasticizer are preliminarily kneaded at a prescribed ratio by using a Henschel mixer, etc., before introduced into the resin-kneading apparatus. More preferably, in the pre-kneading, only a portion of the plasticizer to be used is fed, and the remaining plasticizer is side-fed into the resin kneading apparatus and kneaded while being appropriately heated. By using such kneading methods, the dispersibility of the plasticizer is improved, and when stretching a melt-kneaded product of the resin composition and the plasticizer into a sheet form in a later step, it tends to be stretchable at a high ratio without a membrane rupture.

The plasticizer is preferably a liquid paraffin, because when the polyolefin resin is polyethylene or polypropylene, liquid paraffin is highly compatible with them, and even when the melt-kneaded product is stretched, interfacial stripping between the resin and the plasticizer hardly occurs, which is prone to carry out uniform stretching.

The weight fraction of the polyolefin raw material occupied in the composition consisting of the polyolefin resin composition and the pore-forming material is preferably 18% by weight or more and less than 35% by weight, more preferably 20% by weight or more and less than 33% by weight, and still more preferably 22% by weight or more and less than 31% by weight. When the weight fraction of the polyolefin raw material is less than 35% by weight, the energy upon kneading does not become too large and a decrease in the molecular weight by the excessive interpolymer entanglement can be inhibited, so that the characteristics of the polyolefin microporous membrane are not impaired. On the other hand, when the weight fraction of the polyolefin raw material is 18% by weight or more, enough energy can be imparted upon melt-kneading and the material is uniformly kneaded due to the interpolymer entanglement, so that the entangled polyolefin molecular chains are not released even when the mixture of the polyolefin raw material and the plasticizer is stretched at a high stretching ratio, which can facilitate forming of a uniform and fine pore structure and increase a strength.

When carrying out melt-kneading of the pore-forming material and the polyolefin raw material, the specific energy upon kneading of the polyolefin raw material and the pore-forming material is preferably 0.10 kW·h/kg or more and 0.40 kW·h/kg or less, more preferably 0.12 kW·h/kg or more and 0.35 kW·h/kg or less, and still more preferably 0.14 kW·h/kg or more and 0.30 kW·h/kg or less. The specific energy is a value obtained by dividing the power P (kW) of the screw of the extruder required upon melt-kneading of the pore-forming material and the polyolefin raw material by the extrusion rate Q (kg/h) per unit time of the pore-forming material and the polyolefin raw material. The power P (kW) of the screw of the extruder can be obtained from the following equation:

$$P = T \times N / 9550$$

wherein T (N·m) is the torque applied to the screw upon extrusion and N (rpm) is the screw rotation speed.

When the specific energy is 0.10 kW·h/kg or more, the interpolymer entanglement is promoted, a polyolefin microporous membrane having a uniform pore size and high strength tends to be obtainable by uniformly kneading different polyolefin raw materials. Further, it is assumed that the interpolymer entanglement enables to inhibit a sharp decrease in viscosity when the polyolefin microporous membrane is melted. It is also assumed that when the specific energy is 0.40 kW·h/kg or less, the decrease in the molecular weight or oxidative deterioration due to cleavage or decomposition of the polymer resulting from excessive kneading, is inhibited, which facilitates to inhibit a decrease in the viscosity when the polyolefin microporous membrane melts and reaches an elevated temperature.

In the case of carrying out melt-kneading of the pore-forming material and the polyolefin raw material by using an extruder, the temperature of the melt-kneading section (kneading temperature) is preferably 140° C. or higher and lower than 200° C. and more preferably 150° C. or higher and lower than 190° C. from the viewpoint of the specific energy during the melt-kneading or the membrane strength and the pore size of the polyolefin microporous membrane.

In the case of carrying out melt-kneading of the pore-forming material and the polyolefin raw material by using an extruder, a ratio of an extrusion amount of the polyolefin raw material and the pore-forming material (i.e., discharging amount Q of an extruder: kg/hour) of the extruder) to a number N (rpm) of screw rotation of the extruder (i.e., Q/N, unit: kg/(h rpm)) is preferably 2.2 or more and 7.8 or less, more preferably 2.5 or more and 7.5 or less, still more preferably 2.8 or more and 7.2 or less, and even still more preferably 3.1 or more and 6.9 or less from the viewpoint of the specific energy upon melt-kneading, the membrane strength of the polyolefin microporous membrane, and uniformity of the pore size.

Then, the melt-kneaded product is formed into a sheet. A method for producing a sheet molded body includes, for example, a method including extruding a melt-kneaded product into a sheet through a T die, etc., bringing it into contact with a heat conductor, and cooling to a temperature sufficiently lower than the crystallization temperature of the resin component to solidify it. The heat conductor used for cooling and solidification includes a metal, water, air, plasticizer, etc. Among them, a metal roll is preferred to be used because of the high heat conduction efficiency. Moreover, when the extruded kneaded-product contacts with the metal roll, it is more preferably sandwiched with at least a pair of rolls since the efficiency of heat conduction is enhanced as well as the sheet is oriented, which increases the membrane strength, and the surface smoothness of the sheet also tends to be increased. In extruding of the melt-kneaded product into a sheet form from the T die, the die lip gap is preferably 200 μm or more and 3,000 μm or less, and more preferably 500 μm or more and 2,500 μm or less. When the die lip gap is 200 μm or more, resin wastes, etc., are reduced, the influence on the membrane quality such as streaks and defects is small, and the risk of the membrane rupture, etc., in the subsequent stretching step can be reduced. On the other hand, when the die lip gap is 3,000 μm or less, the cooling rate is fast, which enables to prevent cooling unevenness, and the thickness stability of the sheet can be maintained.

Moreover, the sheet molded body may be also subjected to rolling. The rolling can be carried out by, for example, a press method by using a double belt press machine, etc. By rolling the sheet molded body, degree of orientation of, in particular, orientation of the surface layer can be increased. The rolling ratio by area is preferably more than 1 time and 3 times or less, and more preferably more than 1 time and 2 times or less. When the rolling ratio is more than 1 time, the plane orientation is increased and the membrane strength of the finally obtained separator tends to be increased. On the other hand, when the rolling ratio is 3 times or less, the difference in orientation between the surface layer and the inside of the center is small, which tends to facilitate formation of a porous structure that is uniform in the thickness direction of the membrane.

(Stretching)

The stretching step in which the sheet molded body or the porous membrane is subjected to stretching, may be carried out before a step (pore-forming step) of extracting the pore-forming material from the sheet molded body, or may be carried out for the porous membrane in which the pore-forming material was extracted from the sheet molded body. Furthermore, it may be carried out before and after extracting the pore-forming material from the sheet molded body.

Although either uniaxial stretching or biaxial stretching can be suitably applied as the stretching treatment, biaxial stretching is preferable from the viewpoint of improving the strength, etc., of the obtained porous membrane. Moreover, from the standpoint of the heat shrinkage property of the obtained porous membrane, it is preferable to carry out the stretching step at least twice.

When the sheet molded body is biaxially stretched at a high stretching ratio, the molecules are oriented in a plane direction, and the finally obtained porous membrane tends to hardly tear and has high puncture strength. A stretching method includes, for example: a method including simultaneous biaxial stretching, sequential biaxial stretching, multistage stretching, multiple-time stretching, etc. Simultaneous biaxial stretching is preferable from the viewpoint of uniformity of pore size, uniformity of stretching, and shutdown property.

Simultaneous biaxial stretching refers to a stretching method in which MD (the machine direction of a continuous processing of the microporous membrane) stretching and TD (the transverse direction crossing the MD of the microporous membrane at an angle of 90°) stretching are simultaneously carried out, and the stretching ratio in each direction may be different. Sequential biaxial stretching refers to as a stretching method in which the MD stretching and TD stretching are each carried out independently, and upon MD stretching or TD stretching, the other direction is in a non-constrained state or in anchored state with fixed length.

The stretching ratio is preferably in the range of 28 times or more and less than 100 times in terms of a ratio by area, and more preferably in the range of 32 times or more and 70 times or less, and still more preferably in the range of 36 times or more and 50 times or less. The stretching ratio in each axial direction is preferably 4 times or more and less than 10 times in MD and 4 times or more and less than 10 times in TD, and more preferably 5 times or more and less than 9 times in MD and 5 times or more and less than 9 times in TD, and still more preferably 5.5 times or more and less than 8.5 times in MD and 5.5 times or more and less than 8.5 times in TD. When the total ratio by area is 28 times or more, not only sufficient strength of the obtained polyolefin microporous membrane is obtained but also the pores size does not become too small, which is excellent in cycle characteristics. On the other hand, when the total ratio by area is 100 times or less, excessive thermal shrinkage can be prevented because the residual strength does not become too large, a decrease in tensile elongation at break can be prevented, and excessively large pore or non-uniformity of the pore size can be prevented.

In simultaneous biaxial or sequential biaxial stretching of a sheet molded body or porous membrane, strain rates in MD and TD are preferably 20%/sec or more and 70%/sec or less, more preferably 23%/sec or more and 67%/sec or less, still more preferably 26%/sec or more and 64%/sec or less, even still more preferably 29%/sec or more and 61%/sec or less, and most preferably 32%/sec or more and 58%/sec or less. Although not wishing to be bound by theory, it is assumed that when the strain rates in MD and TD are 20%/sec or more, since the polymers in a sheet molded body are stretched in a state where the interpolymer entanglement is maintained, a polyolefin microporous membrane having a high strength and uniform pore size is obtained, which enables to inhibit a decrease in the viscosity even when the membrane melts and reaches an elevated temperature. The strain rates in MD and TD of 70%/sec or less reduce the residual stress of the obtained polyolefin microporous membrane and tend to lower thermal shrinkage, which is preferred.

The temperature upon stretching of the sheet molded body or the polyolefin microporous membrane is preferably higher than 120° C., and more preferably higher than 122° C. Moreover, the temperature upon stretching is preferably 131° C. or lower, and more preferably 129° C. When the temperature upon stretching, particularly the temperature upon biaxial stretching is higher than 120° C. an increase in thermal shrinkage due to the excessive residual stress can be inhibited. When the temperature upon stretching, particularly the temperature upon biaxial stretching is 131° C. or lower, not only a sufficient strength is imparted to the polyolefin microporous membrane, but also non-uniformity of the pore size distribution due to melting of the membrane surface is avoided, which enables to secure cycle characteristics when a battery is repeatedly charged and discharged.

In order to inhibit a thermal shrinkage of the polyolefin microporous membrane, heat treatment can also be carried out with the aim of heat setting after the stretching step or after formation of the polyolefin microporous membrane.

From the viewpoint of inhibiting thermal shrinkage, the polyolefin microporous membrane is preferably heat set by subjecting it to heat treatment. A method of the heat setting include, for example, a stretching operation carried out at a prescribed temperature atmosphere and prescribed stretching ratio in order to adjust physical properties and/or a relaxation operation carried out at a prescribed temperature atmosphere and prescribed relaxation ratio in order to reduce stretching stress. The relaxation operation may be carried out after the stretching operation. The heat setting can be carried out by using a tenter or a roll stretcher.

In order to obtain a polyolefin microporous membrane with higher strength and higher porosity, the stretching ratios in MD and/or TD of the membrane are preferably 1.1 times or more, more preferably 1.2 times or more, still more preferably more than 1.4 times, and preferably less than 2.3 times, more preferably less than 2.0 times. Moreover, when stretching is carried out in both MD and TD upon heat setting, the product of the stretching ratios in MD and TD is preferably less than 3.5 times, and more preferably less than 3.0 times. When the stretching ratios in MD and/or TD upon heat setting are 1.1 times or more, the effect of high porosity and low heat shrinkage can be obtained, and the ratios of 2.3 times or less enable to prevent an excessively large pore size or a decrease in tensile elongation. The product of the stretching ratios in MD and TD upon heat treatment of less than 3.5 times enables to inhibit an increase in thermal shrinkage.

The stretching operation upon heat setting following this plasticizer extraction is preferably carried out in TD. The temperature in the stretching operation is preferably 110° C. or higher and 140° C. or lower from the viewpoint of inhibiting the TMA stress while maintaining peameability and maintaining uniformity of the pore size.

The relaxation operation is a shrinking operation of the membrane in MD and/or TD. By carrying out a relaxation operation in a range of prescribed conditions, a decrease in the stress accompanied by a temperature rise after melting can be moderated, and a polyolefin microporous membrane that does not rupture even in the vicinity of 160° C. can be obtained. The relaxation ratio is a value obtained by dividing the dimension of the membrane after the relaxation operation by the dimension of the membrane before the relaxation operation. Incidentally, when relaxation was carried out in the both MD and TD, the relaxation ratio refers to a value obtained by multiplying the relaxation ratio in MD and the relaxation ratio in TD. The relaxation ratio is preferably less than 1.0, more preferably less than 0.97, still more preferably less than 0.95, even still more preferably less than 0.90, and most preferably less than 0.85. The relaxation ratio is preferably 0.4 or more, more preferably 0.6 or more, and still more preferably 0.8 or more from the viewpoint of membrane quality. The absolute value of the strain rate upon relaxation is preferably 1.0%/sec or more and 9.0%/sec or less, more preferably 1.5%/sec or more and 8.5%/sec or less, still more preferably 2.0%/sec or more and 8.0%/sec or less, even still more preferably 2.5%/sec or more and 7.5%/sec or less, and most preferably 3.0%/sec or more and 7.0%/sec or less. The relaxation operation may be carried out in both directions of MD and TD, however, may be carried out in either MD or TD. To carry out stretching and relaxation at the aforementioned magnification and strain rate enables to control the thermal shrinkage in MD and/or TD in an appropriate range.

The relaxation operation upon heat setting following this plasticizer extraction is preferably carried out in TD. The temperature in the relaxation operation is preferably 125° C. or higher and 135° C. or lower from the viewpoint of inhibiting the TMA stress and maintaining uniformity of the pore size.

EXAMPLES

The invention will now be explained in greater detail by using Examples and Comparative Examples, with the understanding that the invention is not limited to the examples.
<Measurement of Melt Viscoelasticity of Polyolefin Microporous Membrane>
Sample Preparation A sample for the melt viscoelasticity measurement was prepared by the following method. A plurality of polyolefin microporous membranes were stacked so as to have a total thickness of about 5 mm, pressed by using a press machine at 25° C. and 10 MPa for 2 minutes to remove air between the microporous membranes as much as possible, thereby to obtain a laminate of the polyolefin microporous membrane. The laminate of the polyolefin microporous membrane was disposed on a SUS frame (1.0 mm thick) for forming a sheet having a thickness of 1.0 mm and 10 cm square, pre-heated at 0.1 MPa and 200° C. for 2 minutes by using a press machine, and then pressed at 10 MPa and 200° C. for 2 minutes. Thereafter, it was pressed at 10 MPa and 25° C. for 2 minutes while being disposed in a 1.0 mm SUS frame and cooled and solidified to obtain a polyolefin sheet of about 1.0 mm and an area of about 100 cm². A portion containing no air bubbles was selected from the obtained polyolefin sheet and was punched out by using a punch with a 25 mmφ circular die to obtain a sample for the melt viscoelasticity measurement which has a diameter of 25 mmφ and a thickness of about 1.0 mm. In Example 1, about 500 polyolefin microporous membranes with 5 cm square were stacked to obtain a sample for the melt viscoelasticity measurement by using a press machine.

Melt Viscoelasticity Measurement

Storage modulus (G') and loss tangent (tan δ) were determined under the following conditions under flowing of 1 m³/h of nitrogen into a sample chamber by using a MCR302 manufactured by Anton Paar GmbH.

Measurement temperature: From initial temperature (170° C.) to 300° C.
Increasing temperature rate: 3° C./minute
Fixing jig: 25 mm diameter parallel plate
Sample thickness: about 1.0 mm
Gap: Variable type (an initial value was set to about 1.0 mm, and automatically adjusted as appropriate during measurement so that the load in the normal direction falls within the range of ±0.5 N)
Measurement angular frequency: 1.0 Hz
Shear strain: 1.0%

<DSC Measurement)>

The melting point of the polyolefin microporous membrane was obtained by using a differential scanning calorimetry (DSC) measurement apparatus "DSC-60" (manufactured by Shimadzu Corporation). A temperature was raised from the room temperature to 200° C. at a rate of 10° C./min (a first temperature raising step), then lowered the temperature at 10° C./min to 30° C. (a first temperature lowering step), and again raised to 200° C. at a rate of 10° C./min, i.e., a second temperature raising step, and the temperature at the minimum point of the endothermic peak in the second temperature raising step was taken as a melting point. The value was rounded off at the first decimal place to obtain a melting point of the polyolefin raw material.

<TMA Measurement (Thermomechanical Analysis)>

The TMA measurement of the polyolefin microporous membrane was carried out by using a TMA50 (trademark) of Shimadzu Corporation and a tensile type probe as a dedicated probe. When a value in MD (TD) was measured, a sample cut into 15 mm in MD (TD) and 3.0 mm in width was fixed to chucks so that the distance between chucks was 10 mm and set on a dedicated probe. It was fixed to chucks so that the distance (TD) between the chucks became 10 mm and set on a dedicated probe. The initial load was 0.0049 N (0.5 gf), and the probe was heated to 250° C. at a rate of 10° C./min from 30° C. under the constant length mode. The temperature and load were measured at 1 second intervals until the temperature reached 250° C., and the maximum load value and the load value at 160° C. were obtained.

<Shutdown Characteristics>

Two nickel foils (A, B) having a thickness of 10 µm were prepared, and one of the nickel foils A was masked with a "Teflon (registered trademark)" tape, leaving a square portion of 10 mm in length and 10 mm in width, and was fixed on a slide glass.

Another nickel foil B was placed on a ceramic plate to which a thermocouple was connected, a microporous membrane of a measurement sample immersed in a prescribed electrolytic solution for 3 hours was placed thereon, the slide glass on which a nickel foil was adhered was placed thereon, and the silicone rubber was further placed thereon.

After this was set on a hot plate, the temperature was raised at a rate of 15° C./min while applying a pressure of 1.5 MPa with a hydraulic press.

The impedance change in this case was measured under the conditions of AC 1V and 1 kHz. In this measurement, the temperature at the time when the impedance reached 1000Ω was defined as a shutdown temperature.

In addition, the composition ratio of the specified electrolyte was as follows:

Composition ratio of solvent (volume ratio): propylene carbonate/ethylene carbonate/γ-butyl lactone=1/1/2

Composition ratio of electrolytic solution: $LiBF_4$ was dissolved in the above solvent to a concentration of 1 mol/liter, and trioctyl phosphate was added to a concentration of 0.5% by weight.

The nickel foil 2A and nickel foil 2B were combined in such a manner as to sandwich the microporous film 1 therebetween, and the two nickel foils were further sandwiched by the glass plates 3A and 3B on both sides of the foils. In this case, the window portion of the foil 2B and the microporous film 1 were positioned to be opposite to each other. The two glass plates 3A and 3B were fixed by pinching with a commercially available double clip. The thermocouple 5 was fixed to the glass plate with a "Teflon" (registered trademark) tape.

<Tensile Test>

The tensile test in MD an TD was carried out by using a tensile tester (Shimadzu Autograph AG-A type), and the strength when a sample was broken was divided by a cross-sectional area of the sample before the test to obtain tensile strengths at break (kg/cm²) in MD and TD. Measurement conditions are as follows: temperature: 23 f 2° C., humidity: 40%, sample shape: width 10 mm×length 100 mm, distance between chucks: 50 mm, and tensile speed: 200 mm/min.

The tensile elongation (%) was obtained by dividing the amount of elongation (mm) up to breakage by the distance between chucks (50 mm) and then multiplying by 100.

<Viscosity-Average Molecular Weight (Mv)>

The intrinsic viscosity [η] (dl/g) at 135° C. in a decalin solvent based on ASTM-D4020 was measured.

For polyethylene, the viscosity-average molecular weight was calculated according to the following equation.

$$[\eta]=6.77\times10^{-4} Mv^{0.67}$$

For polypropylene, the viscosity-average molecular weight was calculated according to the following equation.

$$[\eta]=1.10\times10^{-4} \text{ Mv}^{0.80}$$

<Gel Permeation Chromatography (GPC) of Polyolefin Raw Material>

Sample Preparation

The polyolefin raw material was weighed, and 1,2,4-trichlorobenzene (TCB) as eluent was added to a concentration of 1 mg/ml. The sample was stored at 160° C. for 30 minutes by using a high-temperature dissolver, agitated at 160° C. for 1 hour, and visually confirmed that all of the samples were dissolved. The solution was filtered with a 0.5 μm filter while maintained at 160° C. to obtain a filtrate as a sample for GPC measurement.

GPC Measurement

PL-GPC220 (trademark) manufactured by Agilent Technologies as an GPC apparatus and two 30 cm columns of TSKgel GMHHR-H (20) HT (trademark) manufactured by Tosoh Corporation were used, and 500 μl of a GPC measurement sample prepared as described above was injected into the measurement apparatus, and GPC measurement was carried out at 160° C.

It is noted that the calibration curve was prepared by using commercially available monodisperse polystyrenes with known molecular weights as standard materials, and the polystyrene-equivalent molecular weight distribution data were obtained. In the case of polyethylene, the molecular weight distribution data converted to those of polyethylene were obtained by multiplying the determined polystyrene-equivalent molecular weight distribution data of each sample by 0.43 (Q factor of polyethylene/Q factor of polystyrene=17.7/41.3). In the case of polypropylene, the molecular weight distribution data converted to those of polypropylene were obtained by multiplying by (Q factor of polypropylene/Q factor of polystyrene=26.4/41.3). Based on the data, the weight-average molecular weight (Mw) and the molecular weight distribution index (Mw/Mn) of each sample were obtained.

<Average Pore Size (μm)>

The average pore diameter (μm) was measured by using a palm porometer (Porous Materials, Inc.: CFP-1500AE) according to the half dry method. A perfluoropolyester (trade name "Galwick", surface tension of 15.6 dyn/cm) manufactured by the company was used for the immersion liquid. The measurement of the applied pressure and the amount of air permeation were carried out by using the drying curve and the wetting curve, and from the pressure PHD (Pa) at which the half of the obtained drying curve intersected with the wetting curve, the average pore size dHD (μm) was obtained according to the following equation:

$$dHD=2860\times\gamma/PHD$$

<Maximum Pore Size (μm)>

The maximum pore size (μm) was measured using a palm porometer (Porous Materials, Inc.: CFP-1500AE) according to the bubble point method. A perfluoropolyester (trade name "Galwick", surface tension of 15.6 dyn/cm) manufactured by the company was used for the immersion liquid. The applied pressure and the amount of air permeation were measured under the pressure-increase mode by using the wetting curve, and the maximum pore size dBP (μm) was obtained from the pressure PBP (Pa) at which the first bubble was generated in the obtained wetting curve according to the following equation:

$$dBP=2860\times\gamma/PBP$$

<Membrane Thickness (μm)>

The measurement was carried out by using a micro thickness gauge (type KBM, manufactured by Toyo Seiki Co., Ltd.) at room temperature of 23° C. and humidity of 40%. The measurement was also carried out by using terminals having a terminal diameter of 5 mmφ under a load of 44 gf.

<Porosity (%)>

A 10 cm×10 cm square sample was cut out from the microporous membrane, the volume (cm$^3$) and weight (g) of the sample were measured, and the porosity was calculated based on them and the membrane density (g/cm$^3$) according to the following equation:

Porosity (%)=(Volume−Weight/Membrane density)/Volume×100

<Air Permeability (sec/100 cm$^3$)>

A permeability resistance of the polyolefin microporous membrane was measured by using a Gurley type air permeability tester G-B2 (trademark) manufactured by Toyo Seiki Co., Ltd., according to JIS P-8117, at temperature of 23° C. and humidity of 40%, and the permeability resistance was taken as air permeability.

<Puncture Strength (gf)>

A microporous membrane was fixed with a sample holder having an opening diameter of 11.3 mm, by using a handy compression tester KES-G5 (trademark) manufactured by Kato Tech Co., Ltd. Subsequently, a puncture test was carried out by contacting a needle with a tip of a curvature radius of 0.5 mm with the center of the fixed microporous membrane at a puncture speed of 2 mm/sec, an atmospheric temperature of 23° C. and humidity of 40% to obtain a raw puncture strength (gf), which was taken as a maximum puncture load.

Example 1

<Production of Polyolefin Microporous Membrane>

A polyolefin microporous membrane was produced by the following procedures. A composition of the resin raw material contained 70 parts by weight of polyethylene having a melting point of 135° C., viscosity-average molecular weight of 700,000 and molecular weight distribution of 5.0 as the first type polyethylene, 23 parts by weight of polyethylene having a viscosity-average molecular weight of 250,000 and molecular weight distribution of 5.0 as the second type polyethylene and 7 parts by weight of isotactic polypropylene having a melting point of 161° C., viscosity-average molecular weight of 400,000, and molecular weight distribution of 6.0. 0.3 parts by weight of tetrakis-(methylene-3-(3',5'-di-t-butyl-4'-hydroxyphenyl)propionate)methane was mixed as an antioxidant to the resin composition. Each of the obtained mixtures was charged into a twin screw extruder via a feeder. Further, 71 parts by weight of liquid paraffin (kinetic viscosity of 75.90 cSt at 37.78° C.) as a pore-forming material with respect to the total amount of the resin raw material plus liquid paraffin as 100 parts by weight, was poured into the extruder by side feed, kneaded under the conditions of a kneading temperature of 160° C., Q/N of 3.5 kg/(h·rpm) and a specific energy of 0.21 kWh/kg, and was extruded from a T-die which was positioned at the tip of the extruder. Immediately after the extrusion, the sheet was cooled and solidified with a cast roll cooled to 30° C. to form a sheet having a thickness of 1.3 mm. The sheet was stretched 7×6 times at 125° C. by a simultaneous biaxial stretching machine so that the strain rate in MD was 35%/sec and the strain rate in TD was 30%/sec, and then immersed in methylene chloride to extract and remove liquid paraffin. Thereafter, the sheet was dried and stretched 1.9 times in the width direction (TD) at 120° C. by a tenter stretching machine. Thereafter, the stretched sheet was subjected to heat treatment where the sheet was relaxed in the width direction (TD) at a strain rate of −4.2%/sec at 128° C. so as to be relaxed 0.85 times in the width after the transverse stretching, to obtain a polyolefin microporous membrane.

Examples 2 to 23 and Comparative Examples 1 to 14

The polyolefin microporous membranes of Examples 2 to 23 and Comparative Examples 1 to 14 were produced according to the production method of Example 1 and under the conditions described in Tables 1 to 9. The raw material composition, i.e., the first type of polyethylene was represented by PE1, second type of polyethylene was represented by PE2, third type of polyethylene was represented by PE3, and the polypropylene was represented by PP. It is noted that the notation of PE1 to PE3 is for the sake of convenience, which does not mean that the charging order of the raw materials in the present invention is limited to PE1, PE2, and PE3 in this order.

<Nail Puncture Evaluation>

A positive electrode, negative electrode, and electrolytic solution were prepared according to the procedures a, to c, below.

a. Fabrication of Positive Electrode

A slurry was prepared by mixing 90.4% by weight of nickel-manganese-cobalt composite oxide (NMC) (Ni:Mn:Co=1:1:1 (ratio by element), density of 4.70 g/cm$^3$) as a positive electrode active material; 1.6% by weight of graphite powder (KS6) (density of 2.26 g/cm$^3$, number-average particle size of 6.5 μm) and 3.8% by weight of acetylene black powder (AB) (density of 1.95 g/cm$^3$, number-average particle size of 48 nm) as conductive auxiliary agents, and 4.2% by weight of polyvinylidene difluoride (PVDF) (density of 1.75 g/cm$^3$) as a binder; and dispersing them in N-methyl pyrrolidone (NMP). One surface of a 20 μm thick aluminum foil, which was to be used as a positive electrode current collector, was coated with the slurry by using a die coater and dried at 130° C. for 3 minutes, and then the coating foil was compression-molded by using a roll press machine to fabricate a positive electrode. In this case, the coating amount of the positive electrode active material was 109 g/m$^2$.

b. Fabrication of Negative Electrode

A slurry was prepared by dispersing 87.6% by weight of graphite powder A (density of 2.23 g/cm$^3$, number-average particle size of 12.7 μm) and 9.7% by weight of graphite powder B (density of 2.27 g/cm$^3$, number-average particle size of 6.5 μm) as negative electrode active materials; and 1.4% by weight (converted to a solid content) (solid content concentration of 1.83% by weight aqueous solution) of ammonium salt of carboxymethyl cellulose; and 1.7% by weight (converted to a solid content) (solid content concentration of 40% by weight aqueous solution) of a diene rubber-based latex as binders in purified water. One side surface of a 12 μm thick copper foil, which was to be used as a negative electrode current collector was coated with the slurry by using a die coater, dried at 120° C. for 3 minutes, and then compression-molded by using a roll press machine to produce a negative electrode. The coating amount of the negative electrode active material was 52 g/m$^2$.

c. Preparation of Nonaqueous Electrolytic Solution

A nonaqueous electrolytic solution was prepared by dissolving LiPF$_6$ as a solute to 1.0 mol/L in a mixed solvent of ethylene carbonate and ethyl methyl carbonate of 1:2 (at volume ratio).

d. Battery Fabrication

A laminate type secondary battery was fabricated by using the positive electrode, negative electrode, and nonaqueous electrolytic solution obtained in the a, to c., and the separators obtained in Examples 1 to 23, wherein the laminate type secondary battery has a size of 100 mm×60 mm and a capacity of 3 Ah, and was charged with a constant current and constant voltage (CCCV) for 3 hours under the conditions of a current value of 1 A (0.3 C) and a cut-off battery voltage of 4.2 V.

e. Nail Puncture Evaluation

A laminate type secondary battery was placed on the iron plate in an explosion-proof booth. By setting an inner temperature of the explosion-proof booth to 40° C. an iron nail having a diameter of 3.0 mm was stabbed at the center of the laminate type secondary battery at a rate of 2 mm/second so as to pierce the center of the battery, and the nail was kept penetrating therethrough. The temperature of a thermocouple disposed inside of the battery so that the inside temperature of the laminate type battery after the penetration of the nail can be measured, was measured, and the maximum temperature reached and the time (unit: sec.) until a temperature reached 200° C. after the nail penetrated the inside, were measured, evaluated and ranked as follows:

Highest Temperature Reached
 A: 200° C. or lower
 B: Higher than 200° C. and 230° C. or lower.
 C: Higher than 230° C. and 260° C. or lower
 D: Higher than 260° C. and 290° C. or lower
 E: Higher than 290° C. and 320° C. or lower
 F: Higher than 320° C.
 G: In danger of fire or explosion Time to Reach 200° C.
 A: Below 200° C.
 B: 3.5 seconds or longer
 C: 3.2 seconds or longer and shorter than 3.5 seconds
 D: 2.9 seconds or longer and shorter than 3.2 seconds
 E: 2.6 seconds or longer and shorter than 2.9 seconds
 F: 2.3 seconds or longer and shorter than 2.6 seconds
 G: Shorter than 2.3 seconds <Cycle Test>

Cycle characteristics were evaluated on the separators obtained in Examples and Comparative Examples each and the simple battery obtained by the aforementioned procedure d., according to the following procedures.

(1) Pretreatment

The above simple battery was charged with a constant current to a voltage of 4.2 V at a current value of ⅓ C, charged with a constant voltage of 4.2 V for 8 hours and subsequently discharged to a cut-off voltage of 3.0 V at a current of ⅓ C. Then, the battery was charged with a constant current to a voltage of 4.2 V at a current value of 1 C, then charged with a constant voltage of 4.2 V for 3 hours, and further discharged to a cut-off voltage of 3.0 V with a current of 1 C. Finally, the battery was charged with a constant current to 4.2 V at a current value of 1 C and was charged with a constant voltage of 4.2V for 3 hours. Incidentally, 1 C refers to a current value for discharging the reference capacity of a battery in one hour.

(2) Cycle Test

After the pretreatment, the battery was discharged to a discharge cut-off voltage of 3 V with a discharge current of 1 C under the condition of temperature of 25° C., it was charged to a charge cut-off voltage of 4.2 V at a charge current of 1 C, and the discharge and the charge were regarded as one cycle, and these were repeated. Thereafter, the capacity retention ratio of a capacity after 300 cycles to an initial capacity (a capacity at first cycle) was evaluated as cycle characteristics and ranked according to the following criteria.

(3) Evaluation Criteria of Cycle Characteristics
- A: Capacity retention ratio (%) of 95% or more and 100% or less.
- B: Capacity retention ratio (%) of 90% or more and less than 95%.
- C: Capacity retention ratio (%) of 85% or more and less than 90%.
- D: Capacity retention ratio (%) of 80% or more and less than 85%.
- E: Capacity retention ratio (%) of less than 80%.

The polyolefin microporous membranes obtained in Examples 1 to 23 and Comparative Examples 1 to 14 were evaluated according to the aforementioned evaluation methods.

Tables 1 to 9 show the physical properties of the microporous membranes obtained in Examples 1 to 23 and Comparative Examples 1 to 14 and the evaluation results when these were incorporated in a secondary battery. FIG. 1 illustrates an example of the temperature dependence of the storage modulus and the loss tangent of the sample for measuring the melt viscoelasticity obtained in Example 1.

TABLE 1

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Physical properties | Basic properties | Membrane thickness (μm) | 10 | 10 | 11 | 10 | 9 | 10 | 10 | 10 | 10 | 10 | 7 |
| | | Porosity (%) | 45 | 44 | 47 | 46 | 44 | 45 | 44 | 45 | 44 | 45 | 42 |
| | | Air permeability (sec) | 91 | 95 | 82 | 85 | 71 | 83 | 89 | 89 | 70 | 101 | 110 |
| | | Puncture strength (gf) | 260 | 280 | 240 | 260 | 240 | 260 | 220 | 240 | 200 | 340 | 360 |
| | | Puncture strength (gf/μm) | 26 | 28 | 22 | 26 | 27 | 26 | 22 | 24 | 20 | 34 | 51 |
| | tanδ | $\tan\delta_{190}$ | 0.60 | 0.059 | 0.62 | 0.52 | 0.68 | 0.57 | 0.66 | 0.61 | 0.65 | 0.68 | 0.68 |
| | | $\tan\delta_{230}$ | 0.49 | 0.48 | 0.52 | 0.40 | 0.54 | 0.43 | 0.55 | 0.51 | 0.57 | 0.57 | 0.57 |
| | | $\tan\delta_{230}$-$\tan\delta_{190}$ | −0.11 | 0.421 | −0.1 | −0.12 | −0.14 | −0.14 | −0.11 | −0.1 | −0.08 | −0.11 | −0.11 |
| | Storage modulus G' ($\times 10^4$ Pa) | $G'_{190}$ | 7.6 | 7.8 | 7.2 | 9.0 | 6.8 | 10.8 | 7.1 | 7.3 | 6.6 | 6.9 | 7.5 |
| | | $G'_{230}$ | 7.9 | 8.2 | 7.4 | 9.4 | 7.1 | 11.4 | 7.5 | 7.3 | 6.5 | 7.3 | 7.8 |
| | | $G'_{280}$ | 6.8 | 7 | 6.3 | 8.1 | 6 | 10 | 5.9 | 5.5 | 5 | 5.7 | 6.5 |
| | | $G'_{230}$-$G'_{190}$ | 0.3 | 0.4 | 0.2 | 0.4 | 0.3 | 0.6 | 0.4 | 0 | −0.1 | 0.4 | 0.3 |
| | | $G'_{280}$-$G'_{230}$ | −1.1 | −1.2 | −1.1 | −1.3 | −1.1 | −1.4 | −1.6 | −1.8 | −1.5 | −1.6 | −1.3 |
| | TMA maximum load (gf) | MD | 2.0 | 1.9 | 2.2 | 2.4 | 1.7 | 2.2 | 1.8 | 2.0 | 1.5 | 2.7 | 3.4 |
| | | TD | 1.5 | 1.5 | 1.7 | 2.4 | 1.4 | 2.1 | 1.6 | 1.5 | 1.3 | 2.7 | 3.3 |
| | | MD/TD | 1.33 | 1.27 | 1.29 | 1.00 | 1.21 | 1.05 | 1.13 | 1.33 | 1.15 | 1.00 | 1.03 |
| | TMA load at 160° C. (gf) | MD | 0.3 | 0.1 | 0.4 | 0.15 | 0.2 | 0.3 | 0.1 | 0.2 | 0.1 | 0.15 | 0.1 |
| | | TD | 0.2 | 0.1 | 0.4 | 0.15 | 0.15 | 0.2 | 0.1 | 0.2 | 0.1 | 0.2 | 0.1 |
| | Shutdown temperature (° C.) | | 145 | 145 | 148 | 149 | 144 | 148 | 145 | 145 | 145 | 149 | 147 |
| | Tensile stremgth at break (kgf) | MD | 1.2 | 1.2 | 1.1 | 1.3 | 0.9 | 1.2 | 1.1 | 1.2 | 0.9 | 1.5 | 1.5 |
| | | TD | 1.0 | 1.0 | 1.0 | 1.4 | 0.8 | 1.1 | 0.9 | 1.0 | 0.9 | 1.4 | 1.4 |
| | Tensile elongation at break (%) | MD | 100 | 120 | 90 | 100 | 80 | 110 | 95 | 105 | 90 | 90 | 75 |
| | | TD | 110 | 120 | 85 | 95 | 80 | 120 | 95 | 100 | 95 | 95 | 75 |
| | | MD/TD | 0.91 | 1.00 | 1.06 | 1.05 | 1.00 | 0.92 | 1.00 | 1.05 | 0.95 | 0.95 | 1.00 |
| | Pore size (μm) | Average pore size | 0.055 | 0.054 | 0.057 | 0.047 | 0.062 | 0.057 | 0.059 | 0.056 | 0.062 | 0.046 | 0.059 |
| | | Maximum pore size | 0.070 | 0.067 | 0.077 | 0.058 | 0.080 | 0.072 | 0.081 | 0.080 | 0.085 | 0.059 | 0.079 |
| | | Maximum pore size-average pore size | 0.015 | 0.013 | 0.020 | 0.011 | 0.018 | 0.015 | 0.022 | 0.024 | 0.023 | 0.013 | 0.020 |

TABLE 2

| | | | Example 12 | Example 13 | Example 14 | Example 15 | Example 16 | Example 17 | Example 18 | Example 19 | Example 20 | Example 21 | Example 22 | Example 23 |
|---|---|---|---|---|---|---|---|---|---|---|---|---|---|---|
| Physical properties | Basic properties | Membrane thickness (μm) | 10 | 10 | 9 | 10 | 11 | 10 | 10 | 9 | 0 | 10 | 6 | 10 |
| | | Porosity (%) | 45 | 45 | 48 | 46 | 48 | 44 | 45 | 43 | 46 | 45 | 40 | 47 |

TABLE 2-continued

|  |  | Example 12 | Example 13 | Example 14 | Example 15 | Example 16 | Example 17 | Example 18 | Example 19 | Example 20 | Example 21 | Example 22 | Example 23 |
|---|---|---|---|---|---|---|---|---|---|---|---|---|---|
|  | Air permeability (sec) | 94 | 84 | 70 | 90 | 89 | 93 | 95 | 100 | 88 | 95 | 130 | 65 |
|  | Puncture strength (gf) | 260 | 240 | 250 | 240 | 270 | 250 | 280 | 230 | 260 | 280 | 280 | 230 |
|  | Puncture strength (gf/μm) | 26 | 24 | 28 | 24 | 25 | 25 | 28 | 26 | 26 | 28 | 47 | 23 |
| tanδ | $tan\delta_{190}$ | 0.57 | 0.64 | 0.61 | 0.55 | 0.50 | 0.66 | 0.57 | 0.62 | 0.50 | 0.70 | 0.59 | 0.54 |
|  | $tan\delta_{230}$ | 0.46 | 0.55 | 0.49 | 0.43 | 0.37 | 0.56 | 0.45 | 0.51 | 0.38 | 0.58 | 0.48 | 0.40 |
|  | $tan\delta_{230}$-$tan\delta_{190}$ | −0.11 | −0.09 | −0.12 | −0.12 | −0.13 | −0.1 | −0.12 | −0.11 | −0.12 | −0.12 | −0.11 | −0.14 |
| Storage modulus G' (×10$^4$ Pa) | $G'_{190}$ | 8.1 | 7.4 | 7.6 | 11.5 | 7.8 | 7.6 | 13.9 | 3.4 | 3.5 | 12.8 | 7.7 | 11.5 |
|  | $G'_{230}$ | 8.4 | 7.3 | 7.8 | 12.4 | 8.2 | 7.6 | 14.4 | 3.3 | 3.8 | 12.8 | 7.9 | 12.6 |
|  | $G'_{280}$ | 7.1 | 6.1 | 6.8 | 10.6 | 6.8 | 6.6 | 12.5 | 2.7 | 3 | 11.4 | 6.8 | 11.3 |
|  | $G'_{230}$-$G'_{190}$ | 0.3 | −0.1 | 0.2 | 0.9 | 0.4 | 0 | 0.5 | −0.1 | 0.3 | 0 | 0.2 | 1.1 |
|  | $G'_{280}$-$G'_{230}$ | −1.3 | −1.2 | −1 | −1.8 | −1.4 | −1 | −1.9 | −0.6 | −0.8 | −1.4 | −1.1 | −1.3 |
| TMA maximum load (gf) | MD | 2.5 | 1.9 | 2.4 | 2.8 | 3.3 | 2.2 | 4.1 | 1.8 | 3.2 | 3.7 | 2.0 | 1.6 |
|  | TD | 2.3 | 1.4 | 2.1 | 2.5 | 2.9 | 2.3 | 3.2 | 1.3 | 2.7 | 2.8 | 2.7 | 1.3 |
|  | MD/TD | 1.09 | 1.36 | 1.14 | 1.12 | 1.14 | 0.96 | 1.28 | 1.38 | 1.19 | 1.32 | 0.74 | 1.23 |
| TMA load at 160° C. (gf) | MD | 0.03 | 0.3 | 0.1 | 0.1 | 0.3 | 0.03 | 0.3 | 0.3 | 0.25 | 0.1 | 0.25 | 0 |
|  | TD | 0.03 | 0.2 | 0.1 | 0.1 | 0.2 | 0.05 | 0.2 | 0.2 | 0.25 | 0.1 | 0.15 | 0 |
| Shutdown temperature (° C.) |  | 146 | 145 | 146 | 151 | 147 | 145 | 148 | 143 | 145 | 147 | 147 | 146 |
| Tensile stremgth at break (kgf) | MD | 1.2 | 1.1 | 1 | 1.5 | 1.3 | 1.1 | 1.3 | 0.9 | 0.95 | 1.2 | 1.4 | 1 |
|  | TD | 1.1 | 1.1 | 1.2 | 1.1 | 1.1 | 1.0 | 0.9 | 0.8 | 0.9 | 0.9 | 1.7 | 0.9 |
| Tensile elongation at break (%) | MD | 100 | 100 | 100 | 80 | 110 | 90 | 90 | 110 | 90 | 85 | 70 | 110 |
|  | TD | 100 | 105 | 80 | 90 | 110 | 110 | 100 | 120 | 90 | 95 | 80 | 130 |
|  | MD/TD | 1.00 | 0.95 | 1.25 | 0.89 | 1.00 | 0.82 | 0.90 | 0.92 | 1.00 | 0.89 | 0.88 | 0.85 |
| Pore size (μm) | Average pore size | 0.053 | 0.061 | 0.061 | 0.065 | 0.053 | 0.062 | 0.053 | 0.072 | 0.068 | 0.058 | 0.060 | 0.064 |
|  | Maximum pore size | 0.060 | 0.087 | 0.082 | 0.088 | 0.072 | 0.080 | 0.080 | 0.093 | 0.095 | 0.088 | 0.090 | 0.079 |
|  | Maximum pore size-average pore size | 0.007 | 0.026 | 0.021 | 0.023 | 0.019 | 0.021 | 0.027 | 0.021 | 0.027 | 0.030 | 0.030 | 0.015 |

TABLE 3-1

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Physical properties | Basic properties | Membrane thickness (μm) | 10 | 9 | 10 | 10 | 10 | 9 | 10 |
|  |  | Porosity (%) | 45 | 43 | 45 | 45 | 44 | 41 | 42 |
|  |  | Air permeability (sec) | 90 | 98 | 80 | 91 | 94 | 125 | 224 |
|  |  | Puncture strength (gf) | 200 | 370 | 250 | 330 | 220 | 180 | 190 |
|  |  | Puncture strength (gf/μm) | 20 | 41 | 25 | 33 | 22 | 20 | 19 |
|  | tanδ | $tan\delta_{190}$ | 0.83 | 0.48 | 0.77 | 0.45 | 0.73 | 0.79 | 0.38 |
|  |  | $tan\delta_{230}$ | 0.78 | 0.33 | 0.72 | 0.33 | 0.61 | 0.75 | 0.30 |
|  |  | $tan\delta_{230}$-$tan\delta_{190}$ | −0.05 | −0.15 | −0.05 | −0.12 | −0.12 | −0.04 | −0.08 |
|  | Storage modulus G' (×10$^4$ Pa) | $G'_{190}$ | 5.9 | 14.1 | 5.8 | 12.2 | 5.7 | 4.8 | 14.8 |
|  |  | $G'_{230}$ | 5.7 | 14.9 | 5.6 | 12.8 | 5.7 | 4.5 | 14.9 |
|  |  | $G'_{280}$ | 5 | 13.1 | 4.6 | 11.2 | 4.8 | 2.8 | 12 |
|  |  | $G'_{230}$-$G'_{190}$ | −0.2 | 0.8 | −0.2 | 0.6 | 0 | −0.3 | 0.1 |
|  |  | $G'_{280}$-$G'_{230}$ | −0.7 | −1.8 | −1 | −1.6 | −0.9 | −1.7 | −2.9 |
|  | TMA maximum load (gf) | MD | 1.5 | 3.8 | 2.0 | 2.7 | 1.8 | 3.2 | 4.9 |
|  |  | TD | 1.2 | 3.5 | 1.8 | 2.8 | 1.6 | 3.4 | 4 |
|  |  | MD/TD | 1.25 | 1.09 | 1.11 | 0.96 | 1.13 | 0.94 | 1.23 |

TABLE 3-1-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| TMA load at 160° C. (gf) | MD | 0.1 | 0.05 | 0.1 | 0 | 0.02 | 0 | 0.3 |
|  | TD | 0.1 | 0.05 | 0.1 | 0 | 0.03 | 0 | 0.3 |
| Shutdown temperature (° C.) |  | 140 | 152 | 143 | 151 | 143 | 144 | 151 |
| Tensile stremgth at break (kgf) | MD | 0.9 | 1.8 | 1.2 | 1.8 | 1.1 | 0.8 | 1.8 |
|  | TD | 0.8 | 1.7 | 1.1 | 1.5 | 0.9 | 0.7 | 1.7 |
| Tensile elongation at break (%) | MD | 80 | 50 | 80 | 70 | 90 | 85 | 170 |
|  | TD | 90 | 50 | 70 | 80 | 95 | 90 | 250 |
|  | MD/TD | 0.89 | 1.00 | 1.14 | 0.88 | 0.95 | 0.94 | 0.68 |
| Pore size (μm) | Average pore size | 0.068 | 0.045 | 0.062 | 0.048 | 0.062 | 0.068 | 0.041 |
|  | Maximum pore size | 0.098 | 0.052 | 0.080 | 0.057 | 0.083 | 0.105 | 0.048 |
|  | Maximum pore size-average pore size | 0.030 | 0.007 | 0.018 | 0.009 | 0.021 | 0.037 | 0.007 |

TABLE 3-2

|  |  |  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|
| Physical properties | Basic properties | Membrane thickness (μm) | 14 | 11 | 10 | 10 | 10 | 10 | 10 |
|  |  | Porosity (%) | 40 | 48 | 45 | 46 | 45 | 44 | 45 |
|  |  | Air permeability (sec) | 140 | 91 | 91 | 90 | 90 | 91 | 91 |
|  |  | Puncture strength (gf) | 450 | 300 | 260 | 270 | 270 | 220 | 210 |
|  |  | Puncture strength (gf/μm) | 32 | 27 | 26 | 27 | 27 | 22 | 21 |
|  | tanδ | tanδ$_{190}$ | 0.68 | 0.48 | 0.70 | 0.71 | 0.46 | 0.71 | 0.75 |
|  |  | tanδ$_{230}$ | 0.65 | 0.33 | 0.63 | 0.61 | 0.32 | 0.63 | 0.61 |
|  |  | tanδ$_{230}$-tanδ$_{190}$ | -0.03 | -0.15 | -0.07 | -0.1 | -0.14 | -0.08 | -0.14 |
|  | Storage modulus G' (×10$^4$ Pa) | G'$_{190}$ | 5.1 | 9.2 | 7.5 | 12.1 | 4.2 | 5.8 | 5.9 |
|  |  | G'$_{230}$ | 4.9 | 9.7 | 7.4 | 12 | 4.4 | 5.6 | 5.9 |
|  |  | G'$_{280}$ | 3.5 | 8 | 6.5 | 10.5 | 3.3 | 3.9 | 5.5 |
|  |  | G'$_{230}$-G'$_{190}$ | -0.2 | 0.5 | -0.1 | -0.1 | 0.2 | -0.2 | 0 |
|  |  | G'$_{280}$-G'$_{230}$ | -1.4 | -1.7 | -0.9 | -1.5 | -1.1 | -1.7 | -0.4 |
|  | TMA maximum load (gf) | MD | 4.7 | 3.8 | 1.5 | 3.2 | 3.5 | 1.4 | 1.9 |
|  |  | TD | 4.3 | 3.5 | 1.5 | 2.4 | 3.5 | 1.2 | 1.7 |
|  |  | MD/TD | 1.09 | 1.09 | 1.00 | 1.33 | 1.00 | 1.17 | 1.12 |
|  | TMA load at 160° C. (gf) | MD | 0.05 | 0.3 | 0 | 0.05 | 0.3 | 0.3 | 0.03 |
|  |  | TD | 0.2 | 0.3 | 0 | 0.1 | 0.25 | 0.2 | 0.03 |
|  | Shutdown temperature (° C.) |  | 149 | 151 | 144 | 147 | 147 | 145 | 147 |
|  | Tensile stremgth at break (kgf) | MD | 2 | 1.4 | 1.1 | 1.1 | 1.1 | 0.9 | 0.95 |
|  |  | TD | 1.7 | 1.2 | 0.9 | 0.9 | 1.1 | 0.9 | 0.9 |
|  | Tensile elongation at break (%) | MD | 80 | 90 | 85 | 90 | 80 | 80 | 70 |
|  |  | TD | 95 | 100 | 105 | 95 | 80 | 75 | 75 |
|  |  | MD/TD | 0.84 | 0.90 | 0.81 | 0.95 | 1.00 | 1.07 | 0.93 |
|  | Pore size (μm) | Average pore size | 0.039 | 0.052 | 0.070 | 0.060 | 0.066 | 0.070 | 0.081 |
|  |  | Maximum pore size | 0.049 | 0.075 | 0.091 | 0.091 | 0.097 | 0.096 | 0.117 |
|  |  | Maximum pore size-average pore size | 0.010 | 0.023 | 0.021 | 0.031 | 0.031 | 0.026 | 0.036 |

TABLE 4

|  |  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Production conditions | PE1 | Mv(×10$^4$) | 70 | 70 | 70 | 70 | 70 | 70 | 70 | 70 | 70 | 70 | 70 |
|  |  | Mw/Mn | 5 | 5 | 5 | 5 | 5 | 5 | 5 | 5 | 5 | 5 | 5 |
|  |  | Melting point | 135 | 135 | 135 | $35 | 135 | 135 | 135 | 135 | 135 | 135 | 135 |
|  |  | Proportion | 70 | 70 | 70 | 80 | 60 | 20 | 70 | 70 | 70 | 70 | 70 |

TABLE 4-continued

|  |  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
|  | PE2 | Mv(×10$^4$) | 25 | 25 | 25 | 25 | 25 | 25 | 25 | 25 | 25 | 25 | 25 |
|  |  | Mw/Mn | 5 | 5 | 5 | 5 | 5 | 5 | 5 | 5 | 5 | 5 | 5 |
|  |  | Melting point | 135 | 135 | 135 | 135 | 135 | 135 | 135 | 135 | 135 | 135 | 135 |
|  |  | Proportion | 23 | 21 | 21 | 15 | 35 | 35 | 23 | 23 | 23 | 23 | 23 |
|  | PE3 | Mv(×10$^4$) | — | — | — | — | — | 90 | — | — | — | — | — |
|  |  | Mw/Mn | — | — | — | — | — | 5 | — | — | — | — | — |
|  |  | Melting point | — | — | — | — | — | 135 | — | — | — | — | — |
|  |  | Proportion | — | — | — | — | — | 50 | — | — | — | — | — |
|  | PP | Mv(×10$^4$) | 40 | 40 | 40 | 40 | 40 | 40 | 40 | 40 | 40 | 40 | 40 |
|  |  | Mw/Mn | 6 | 6 | 6 |  | 6 | 6 | 6 | 6 | 6 | 6 | 6 |
|  |  | Melting point | 161 | 161 | 161 | 161 | 161 | 161 | 161 | 161 | 161 | 161 | 161 |
|  |  | Proportion | 7 | 3 | 9 | 5 | 5 | 5 | 7 | 7 | 7 | 7 | 7 |
|  | Extrusion | Polymer concentration (%) | 29 | 29 | 29 | 29 | 29 | 25 | 29 | 29 | 29 | 33 | 29 |
|  |  | Kneading temperature (° C.) | 160 | 160 | 160 | 160 | 160 | 160 | 160 | 160 | 190 | 160 | 160 |
|  |  | Q/Ns(kg/h · rpm)) | 3.5 | 3.5 | 3.5 | 3.5 | 3.5 | 3.5 | 2.2 | 4.7 | 3.2 | 3.5 | 3.5 |
|  |  | Specific energy (kWh/kg) | 0.21 | 0.22 | 0.19 | 0.25 | 0.18 | 0.21 | 0.33 | 0.16 | 0.13 | 0.33 | 0.21 |
|  | Biaxial Stretching | Ratio (MD × TD) | 7 × 6 | 7 × 6 | 7 × 6 | 7 × 6 | 7 × 6 | 7 × 6 | 7 × 6 | 7 × 6 | 7 × 6 | 7 × 6 | 8 × 7 |
|  |  | Strain rate (%/sec) (MD/TD) | 35/30 | 35/30 | 35/30 | 35/30 | 35/30 | 35/30 | 35/30 | 35/30 | 35/30 | 35/30 | 37/32 |
|  |  | Temperature (° C.) | 125 | 125 | 125 | 128 | 122 | 125 | 125 | 125 | 125 | 125 | 125 |
|  | Heat setting | Stretching temperature (° C.) | 123 | 123 | 123 | 123 | 123 | 123 | 123 | 123 | 123 | 123 | 123 |
|  |  | Stretching ratio | 1.9 | 1.9 | 1.9 | .9 | 1.9 | 1.9 | 1.9 | 1.9 | 1.9 | 1.9 | 1.9 |
|  |  | Relaxation temperature (° C.) | 128 | 128 | 128 | 128 | 128 | 128 | 128 | 128 | 128 | 128 | 128 |
|  |  | Relaxation ratio | 0.85 | 0.85 | 0.85 | 0.85 | 0.85 | 0.85 | 0.85 | 0.85 | 0.85 | 0.85 | 0.85 |
|  |  | Relaxation rate (%/sec) | −4.2 | −4.2 | −4.2 | −4.2 | −4.2 | −4.2 | −4.2 | −4.2 | 4.2 | −4.2 | −4.3 |

TABLE 5

|  |  |  | Example 12 | Example 13 | Example 14 | Example 15 | Example 16 | Example 17 |
|---|---|---|---|---|---|---|---|---|
| Production conditions | PE1 | Mv(×10$^4$) | 70 | 70 | 70 | 90 | 70 | 70 |
|  |  | Mw/Mn | 5 | 5 | 5 | 5 | 5 | 5 |
|  |  | Melting point | 135 | 135 | 135 | 135 | 135 | 135 |
|  |  | Proportion | 70 | 70 | 70 | 80 | 70 | 70 |
|  | PE2 | Mv(×10$^4$) | 25 | 25 | 25 | 15 | 25 | 25 |
|  |  | Mw/Mn | 5 | 5 | 5 | 5 | 5 | 5 |
|  |  | Melting point | 135 | 135 | 135 | 135 | 135 | 135 |
|  |  | Proportion | 23 | 23 | 23 | 15 | 2.3 | 23 |
|  | PE3 | Mv(×10$^4$) | — | — | — | — | — | — |
|  |  | Mw/Mn | — | — | — | — | — | — |
|  |  | Melting point | — | — | — | — | — | — |
|  |  | Proportion | — | — | — | — | — | — |
|  | PP | Mv(×10$^4$) | 40 | 40 | 40 | 40 | 100 | 25 |
|  |  | Mw/Mn | 6 | 6 | 6 | 6 | 7 | 6 |
|  |  | Melting point | 161 | 161 | 161 | 161 | 160 | 161 |
|  |  | Proportion | 7 | 7 | 7 | 5 | 7 | 7 |
|  | Extrusion | Polymer concentration (%) | 29 | 29 | 29 | 29 | 29 | 29 |
|  |  | Kneading temperature (° C.) | 160 | 160 | 160 | 160 | 160 | 160 |
|  |  | Q/Ns (kg/h · rpm)) | 3.5 | 3.5 | 3.5 | 3.5 | 3.5 | 3.5 |
|  |  | Specific energy (kWh/kg) | 0.21 | 0.21 | 0.21 | 0.21 | 0.21 | 0.19 |
|  | Biaxial Stretching | Ratio (MD × TD) | 7 × 6 | 7 × 6 | 7 × 6 | 7 × 6 | 7 × 6 | 7 × 6 |
|  |  | Strain rate (%/sec) (MD/TD) | 60/55 | 25/22 | 35/30 | 35/30 | 35/30 | 35/30 |
|  |  | Temperature (° C.) | 125 | 125 | 125 | 127 | 125 | 125 |
|  | Heat setting | Stretching temperature (° C.) | 123 | 123 | 123 | 123 | 123 | 123 |
|  |  | Stretching ratio | 1.9 | 1.9 | 1.7 | 1.9 | 1.9 | 1.9 |
|  |  | Relaxation temperature (° C.) | 128 | 128 | 125 | 128 | 128 | 128 |
|  |  | Relaxation ratio | 0.85 | 0.85 | 0.95 | 0.85 | 0.85 | 0.85 |
|  |  | Relaxation rate (%/sec) | −8.0 | −2.0 | −4.2 | −4.2 | −4.2 | −4.2 |

TABLE 5-continued

|  |  |  | Example 18 | Example 19 | Example 20 | Example 21 | Example 22 | Example 23 |
|---|---|---|---|---|---|---|---|---|
| Production conditions | PE1 | Mv(×10$^4$) | 70 | 70 | 70 | 70 | 70 | 70 |
|  |  | Mw/Mn | 5 | 5 | 5 | 5 | 5 | 5 |
|  |  | Melting point | 135 | 135 | 135 | 135 | 135 | 135 |
|  |  | Proportion | 55 | 60 | 60 | 50 | 70 | 55 |
|  | PE2 | Mv(×10$^4$) | 25 | 25 | 25 | 25 | 25 | 25 |
|  |  | Mw/Mn | 5 | 5 | 5 | 5 | 5 | 5 |
|  |  | Melting point | 135 | 135 | 135 | 135 | 135 | 135 |
|  |  | Proportion | 28 | 23 | 23 | 30 | 23 | 15 |
|  | PE3 | Mv(×10$^4$) | 150 | 15 (low density polyethylene) | 15 (low density polyethylene) | 150 | — | 90 |
|  |  | Mw/Mn | 7 | 5 | 5 | 7 | — | 7 |
|  |  | Melting point | 135 | 130 | 130 | 135 | — | 135 |
|  |  | Proportion | 10 | 10 | 10 | 10 | — | 30 |
|  | PP | Mv(×10$^4$) | 25 | 40 | 100 | 20 | 40 | — |
|  |  | Mw/Mn | 6 | 6 | 7 | 6 | 6 | — |
|  |  | Melting point | 161 | 161 | 160 | 161 | 161 | — |
|  |  | Proportion | 7 | 7 | 7 | 10 | 7 | — |
|  | Extrusion | Polymer concentration (%) | 29 | 29 | 29 | 29 | 29 | 24 |
|  |  | Kneading temperature (° C.) | 160 | 160 | 160 | 160 | 160 | 160 |
|  |  | Q/Ns (kg/h · rpm)) | 3.5 | 3.5 | 3.5 | 3.5 | 3.5 | 3.8 |
|  |  | Specific energy (kWh/kg) | 0.28 | 0.15 | 0.20 | 0.25 | 0.21 | 0.22 |
|  | Biaxial Stretching | Ratio (MD × TD) | 7 × 6 | 7 × 6 | 7 × 6 | 7 × 6 | 7 × 6 | 7 × 6 |
|  |  | Strain rate (%/sec) (MD/TD) | 35/30 | 35/30 | 35/30 | 35/30 | 35/30 | 35/30 |
|  |  | Temperature (° C.) | 125 | 125 | 125 | 125 | 125 | 126 |
|  | Heat setting | Stretching temperature (° C.) | 123 | 123 | 123 | 123 | 123 | 123 |
|  |  | Stretching ratio | 1.9 | 1.9 | 1.9 | 1.9 | 2.4 | 1.9 |
|  |  | Relaxation temperature (° C.) | 128 | 128 | 128 | 128 | 132 | 128 |
|  |  | Relaxation ratio | 0.85 | 0.85 | 0.85 | 0.85 | 0.95 | 0.85 |
|  |  | Relaxation rate (%/sec) | −4.2 | −4.2 | −4.2 | −4.2 | −1.4 | −4.2 |

TABLE 6-1

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Production conditions | PE1 | Mv(×10$^4$) | 70 | 70 | 25 | 90 | 70 | 70 | 200 |
|  |  | Mw/Mn | 5 | 5 | 5 | 5 | 5 | 5 | 5 |
|  |  | Melting point | 35 | 135 | 135 | 135 | 135 | 135 | 135 |
|  |  | Proportion | 30 | 20 | 30 | 95 | 45 | 50 | 20 |
|  | PE2 | Mv(×10$^4$) | 25 | 25 | 70 | 25 | 25 | 25 | 35 |
|  |  | Mw/Mn | 5 | 5 | 5 | 5 | 5 | 5 | 5 |
|  |  | Melting point | 135 | 135 | 135 | 135 | 135 | 135 | 135 |
|  |  | Proportion | 35 | 50 | 65 | 5 | 50 | 46 | 60 |
|  | PE3 | Mv(×10$^4$) | 15 | 200 | — | — | — | — | — |
|  |  | Mw/Mn | 5 | 7 | — | — | — | — | — |
|  |  | Melting point | 131 | 135 | — | — | — | — | — |
|  |  | Proportion | 5 | 25 | — | — | — | — | — |
|  | PP | Mv(×10$^4$) | 40 | 40 | 40 | — | 40 | 40 | 30 |
|  |  | Mw/Mn | 6 | 6 | 6 | — | 6 | 6 | 6 |
|  |  | Melting point | 161 | 161 | 161 | — | 161 | 161 | 165 |
|  |  | Proportion | 5 | 5 | 5 | — | 5 | 4 | 20 |
|  | Extrusion | Polymer concentration (%) | 45 | 25 | 32 | 29 | 32 | 37 | 30 |
|  |  | Kneading temperature (° C.) | 60 | 160 | 160 | 160 | 160 | 220 | 200 |
|  |  | Q/Ns(kg/h · rpm)) | 3.5 | 3.5 | 3.5 | 3.5 | 3.5 | 0.08 | 0.08 |
|  |  | Specific energy (kWh/kg) | 0.45 | 0.13 | 0.21 | 0.25 | 0.23 | 0.72 | 0.72 |
|  | Biaxial Stretching | Ratio (MD × TD) | 7 × 6 | 7 × 6 | 7 × 6 | 7 × 6 | 7 × 6 | 7 × 6.4 | 5 × 5 |
|  |  | Strain rate (%/sec) (MD/TD) | 35/30 | 35/30 | 35/30 | 35/30 | 35/30 | 13/10 | 9/7 |
|  |  | Temperature (° C.) | 125 | 125 | 125 | 125 | 125 | 124 | 115 |
|  | Heat setting | Stretching temperature (° C.) | 123 | 123 | 123 | 123 | 123 | 127 | 120 |
|  |  | Stretching ratio | 1.9 | 1.9 | 1.9 | 1.9 | 1.9 | 1.4 | 1.0 (the sample was not stretched.) |
|  |  | Relaxation temperature (° C.) | 128 | 128 | 128 | 128 | 128 | 1 | 120 |
|  |  | Relaxation ratio | 0.85 | 0.85 | 0.85 | 0.85 | 0.85 | 1.0 | 1.0 |

TABLE 6-1-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
|  | Relaxation rate (%/sec) | −4.2 | −4.2 | −4.2 | −4.2 | −4.2 | (the sample was not relaxed.) — | (the sample was not relaxed.) — |

TABLE 6-2

| | | | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|
| Production conditions | PE1 | Mv(×10$^4$) | 70 | 70 | 70 | 70 | 120 | 70 | 70 |
| | | Mw/Mn | 5 | 5 | 5 | 5 | 6 | 5 | 5 |
| | | Melting point | 135 | 135 | 135 | 135 | 135 | 135 | 135 |
| | | Proportion | 60 | 80 | 60 | 40 | 60 | 70 | 70 |
| | PE2 | Mv(×10$^4$) | 25 | 25 | 25 | 25 | 25 | 25 | 25 |
| | | Mw/Mn | 5 | 5 | 5 | 5 | 5 | 5 | 5 |
| | | Melting point | 135 | 135 | 135 | 135 | 135 | 135 | 135 |
| | | Proportion | 35 | 10 | 30 | 40 | 15 | 23 | 23 |
| | PE3 | Mv(×10$^4$) | — | — | — | 150 | 15 (low density polyethylene) | — | — |
| | | Mw/Mn | — | — | — | 7 | 5 | — | — |
| | | Melting point | — | — | — | 135 | 130 | — | — |
| | | Proportion | — | — | — | 10 | 15 | — | — |
| | PP | Mv(×10$^4$) | 40 | 150 | 10 | 20 | 100 | 40 | 40 |
| | | Mw/Mn | 6 | 7 | 6 | 6 | 7 | 6 | 6 |
| | | Melting point | 161 | 160 | 161 | 161 | 160 | 161 | 161 |
| | | Proportion | 5 | 10 | 10 | 10 | 10 | 7 | 7 |
| | Extrusion | Polymer concentration (%) | 35 | 29 | 29 | 29 | 29 | 29 | 29 |
| | | Kneading temperature (° C.) | 160 | 160 | 160 | 160 | 160 | 150 | 160 |
| | | Q/Ns(kg/h · rpm)) | 0.08 | 3.5 | 3.5 | 3.5 | 3.5 | 2.0 | 3.5 |
| | | Specific energy (kWh/kg) | 0.85 | 0.32 | 0.14 | 0.22 | 0.27 | 0.43 | 0.21 |
| | Biaxial Stretching | Ratio (MD × TD) | 7 × 6.4 | 7 × 6 | 7 × 6 | 7 × 6 | 7 × 6 | 7 × 6 | 7 × 6 |
| | | Strain rate (%/sec) (MD/TD) | 13/10 | 35/30 | 35/30 | 35/30 | 35/30 | 35/30 | 8/8 |
| | | Temperature (° C.) | 121 | 125 | 125 | 125 | 125 | 125 | 125 |
| | Heat setting | Stretching temperature (° C.) | 115 | 123 | 123 | 123 | 123 | 123 | 123 |
| | | Stretching ratio | 1.4 | 1.9 | 1.9 | 1.9 | 1.9 | 1.9 | 1.9 |
| | | Relaxation temperature (° C.) | 123 | 128 | 128 | 128 | 128 | 128 | 128 |
| | | Relaxation ratio | 0.79 | 0.85 | 0.85 | 0.85 | 0.85 | 0.85 | 0.85 |
| | | Relaxation rate (%/sec) | −2 | −4.2 | −4.2 | −4.2 | −4.2 | −4.2 | −1 |

TABLE 7

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Battery evaluation | Nail puncture test | Maximum temperature reached | A | B | B | B | C | C | C | C | C | C | C |
| | | Time to reach 200° C. | A | B | D | D | B | D | B | D | B | D | D |
| | | Cycle test | B | A | B | A | B | B | C | C | C | B | A |

TABLE 8

| | | | Example 12 | Example 13 | Example 14 | Example 15 | Example 16 | Example 17 | Example 18 | Example 19 | Example 20 | Example 21 | Example 22 | Example 23 |
|---|---|---|---|---|---|---|---|---|---|---|---|---|---|---|
| Battery evaluation | Nail puncture test | Maximum temperature reached | C | C | C | C | D | D | D | D | D | D | D | C |

TABLE 8-continued

|  |  | Example 12 | Example 13 | Example 14 | Example 15 | Example 16 | Example 17 | Example 18 | Example 19 | Example 20 | Example 21 | Example 22 | Example 23 |
|---|---|---|---|---|---|---|---|---|---|---|---|---|---|
| Time to reach 200° C. | | B | B | C | D | D | B | D | B | C | D | D | B |
| Cycle test | | A | C | C | C | B | D | C | C | D | D | D | B |

TABLE 9-1

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Battery evaluation | Nail puncture test | Maximum temperature reached | F | F | F | F | E | G | G |
|  |  | Time to reach 200° C. | B | F | C | E | C | C | D |
|  |  | Cycle test | E | B | B | B | C | E | E |

TABLE 9-2

|  |  |  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|
| Battery evaluation | Nail puncture test | Maximum temperature reached | G | E | E | E | F | F | E |
|  |  | Time to reach 200° C. | C | E | D | D | D | C | E |
|  |  | Cycle test | E | E | E | E | E | E | E |

It was confirmed that the evaluation results on the maximum temperature and the time to reach 200° C. in Examples 1 to 23 were all ranked in the range of "A" to "D", compared with those of Comparative Examples 1 to 14. Therefore, it was found that the thermal runaway can be inhibited in Examples 1 to 23 as compared with that in Comparative Examples 1 to 14. Moreover, the evaluation results on the cycle characteristics were also in the range of "A" to "D" in Examples 1 to 23, Therefore, it was found that the favorable cycle characteristics in Examples 1 to 23 can be secured and the thermal runaway can be inhibited in Examples 1 to 23.

The invention claimed is:

1. A polyolefin microporous membrane having a loss tangent (tan δ) at 230° C. of 0.35 or more and less than 0.60 in melt viscoelasticity measurement.

2. The polyolefin microporous membrane according to claim 1, having maximum loads in MD and TD both of 3.0 gf or less in TMA measurement.

3. The polyolefin microporous membrane according to claim 1, having a storage modulus (G') at 230° C. of $5.0 \times 10^4$ Pa or more in melt viscoelasticity measurement.

4. The polyolefin microporous membrane according to claim 1, having a difference between a loss tangent at 190° C. (tan $\delta_{190}$) and a loss tangent at 230° C. (tan $\delta_{230}$) (tan $\delta_{230}$−tan $\delta_{190}$) of −0.05 or less (the difference≤−0.05) in melt viscoelasticity measurement.

5. The polyolefin microporous membrane according to claim 1, having a difference between a storage modulus at 190° C. ($G'_{190}$) and a storage modulus at 230° C. ($G'_{230}$) ($G'_{230}$−$G'_{190}$) of $-1.0 \times 10^3$ Pa or more (the difference ≥−1.0× $10^3$ Pa) in melt viscoelasticity measurement.

6. The polyolefin microporous membrane according to claim 1, having a difference between a storage modulus at 230° C. ($G'_{230}$) and a storage modulus at 280° C. ($G'_{230}$) ($G'_{280}$−$G'_{230}$) of $-2.1 \times 10^4$ Pa or more (the difference ≥−2.1× $10^4$ Pa) in melt viscoelasticity measurement.

7. The polyolefin microporous membrane according to claim 1, having loads at 160° C. in MD and TD both of 0.10 gf/10 μm or more in TMA measurement.

8. The polyolefin microporous membrane according to claim 1, having a shutdown temperature of 150° C. or lower when measured at an increasing temperature rate of 15° C./min.

9. The polyolefin microporous membrane according to claim 1, having an average pores size determined by a half dry method of 0.05 μm or more and 0.08 μm or less.

10. The polyolefin microporous membrane according to claim 1, having a difference between a maximum pore size determined by a bubble point method and an average pore size determined by a half dry method of 0.01 μm or more and 0.02 μm or less.

11. The polyolefin microporous membrane according to claim 1, formed from a polyolefin resin composition in which a polyolefin resin occupies 50% by weight or more and 100% by weight or less of resin components constituting the membrane.

12. The polyolefin microporous membrane according to claim 1, wherein resin components constituting the membrane comprise polyethylene and polypropylene, and a proportion of the polypropylene is 1% by weight or more and 10% by weight or less based on a total amount of polyolefin resins in the resin components as 100% by weight.

13. A separator for a battery comprising the polyolefin microporous membrane according to claim 1.

* * * * *